US012140899B2

(12) United States Patent
Suzuki et al.

(10) Patent No.: US 12,140,899 B2
(45) Date of Patent: Nov. 12, 2024

(54) IMAGE FORMING APPARATUS

(71) Applicant: CANON KABUSHIKI KAISHA, Tokyo (JP)

(72) Inventors: Ai Suzuki, Tokyo (JP); Masashi Tanaka, Kawasaki (JP); Shoichiro Ikegami, Yokohama (JP); Kensuke Umeda, Kawasaki (JP); Sho Taguchi, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 16 days.

(21) Appl. No.: 17/868,420

(22) Filed: Jul. 19, 2022

(65) Prior Publication Data

US 2022/0350288 A1 Nov. 3, 2022

Related U.S. Application Data

(62) Division of application No. 17/484,480, filed on Sep. 24, 2021, now Pat. No. 11,422,497, which is a (Continued)

(30) Foreign Application Priority Data

Apr. 26, 2016 (JP) ................................ 2016-087853
Mar. 16, 2017 (JP) ................................ 2017-051599

(51) Int. Cl.
*G03G 15/00* (2006.01)
*G03G 15/041* (2006.01)

(52) U.S. Cl.
CPC ..... *G03G 15/6564* (2013.01); *G03G 15/5008* (2013.01); *G03G 15/0415* (2013.01); (Continued)

(58) Field of Classification Search
CPC .......... G03G 15/1615; G03G 15/5008; G03G 15/6529; G03G 15/6564; (Continued)

(56) References Cited

U.S. PATENT DOCUMENTS 6,085,058 A 7/2000 Goto et al.
6,885,832 B2 4/2005 Osada
(Continued)

FOREIGN PATENT DOCUMENTS

JP 10-333525 A 12/1998
JP 2000-075685 A 3/2000
(Continued)

OTHER PUBLICATIONS

Action dated Feb. 16, 2021, issued in Japanese Patent Application No. 2017-051599.

*Primary Examiner* — Jessica L Eley
(74) *Attorney, Agent, or Firm* — Venable LLP

(57) ABSTRACT

An image forming apparatus includes a photosensitive member; an exposure portion configured to expose the photosensitive member to light depending on image information to form a latent image on the photosensitive member; a developing portion configured to develop the latent image into a toner image with toner; and a transfer portion configured to transfer the toner image from the photosensitive member onto a recording material. The image forming apparatus changes a surface movement speed of the photosensitive member at timing prior to predetermined timing, when a moving speed of a recording material at the transfer portion changes, by a predetermined time.

4 Claims, 17 Drawing Sheets

Related U.S. Application Data division of application No. 16/815,921, filed on Mar. 11, 2020, now Pat. No. 11,150,589, which is a division of application No. 15/496,785, filed on Apr. 25, 2017, now Pat. No. 10,627,768.

(52) U.S. Cl.
CPC ......... *G03G 15/65* (2013.01); *G03G 15/6529* (2013.01); *G03G 15/6555* (2013.01)

(58) Field of Classification Search
CPC ....... G03G 2215/2045; G03G 15/1655; G03G 15/6558; G03G 15/657
See application file for complete search history.

(56) References Cited

U.S. PATENT DOCUMENTS

| | | | |
|---|---|---|---|
| 7,539,455 B2 | 5/2009 | Takiguchi et al. | |
| 7,830,406 B2 | 11/2010 | Horikawa | |
| 8,509,645 B2 | 8/2013 | Ikegami et al. | |
| 9,244,417 B2 | 1/2016 | Tanaka et al. | |
| 9,268,284 B2 | 2/2016 | Yokoyama et al. | |
| 10,627,768 B2 * | 4/2020 | Suzuki | G03G 15/5008 |
| 2003/0095822 A1 | 5/2003 | Kamimura et al. | |
| 2008/0013972 A1 | 1/2008 | Matsuda | |
| 2008/0267653 A1 * | 10/2008 | Ushio | G03G 21/14 399/77 |
| 2009/0154964 A1 * | 6/2009 | Tsuruya | G03G 15/1615 399/66 |
| 2010/0189448 A1 | 7/2010 | Fujiki et al. | |
| 2010/0310288 A1 | 12/2010 | Takagi et al. | |
| 2011/0007120 A1 | 1/2011 | Motoi et al. | |
| 2011/0200373 A1 | 8/2011 | Fujii et al. | |
| 2012/0099908 A1 * | 4/2012 | Yamazoe | G03G 15/1605 271/226 |
| 2012/0269531 A1 * | 10/2012 | Suzuki | G03G 15/657 399/67 |
| 2013/0004204 A1 | 1/2013 | Hagiwara et al. | |
| 2013/0057603 A1 | 3/2013 | Gordon | |
| 2014/0248063 A1 | 9/2014 | Furuta | |
| 2014/0301747 A1 * | 10/2014 | Takahashi | G03G 15/0849 399/53 |
| 2015/0277268 A1 | 10/2015 | Goto et al. | |
| 2017/0308025 A1 * | 10/2017 | Suzuki | G03G 15/5008 |

FOREIGN PATENT DOCUMENTS

| | | |
|---|---|---|
| JP | 2000-181262 A | 6/2000 |
| JP | 2002-278204 A | 9/2002 |
| JP | 2003-307989 A | 10/2003 |
| JP | 2003-316229 A | 11/2003 |
| JP | 2006-201403 A | 8/2006 |
| JP | 2006-317730 A | 11/2006 |
| JP | 2008-233858 A | 10/2008 |
| JP | 2008-309906 A | 12/2008 |
| JP | 2012-098590 A | 5/2012 |
| JP | 2012-101497 A | 5/2012 |
| JP | 2013-164558 A | 8/2013 |
| JP | 2014-056130 A | 3/2014 |
| JP | 2015-108655 A | 6/2015 |

* cited by examiner (a)

(b)

(a)

(b)

IMAGE FORMING APPARATUS

FIELD OF THE INVENTION AND RELATED ART

The present invention relates to an image forming apparatus such as an electrophotographic copying machine or an electrophotographic printer.

An example of the image forming apparatus of an electrophotographic type will be described with reference to FIG. 13. FIG. 13 is a sectional view showing a general structure of the example of the image forming apparatus (monochromatic printer) of the electrophotographic type.

In an image forming apparatus 100, an outer peripheral surface of a photosensitive drum 1 during a rotational operation is electrically charged uniformly to a predetermined potential and a predetermined polarity by a charging roller 2.

At an exposure portion 3 of a laser scanner type, a polygon mirror during a rotational operation is irradiated with laser light L outputted from a laser oscillator. The polygon mirror carries out scanning exposure (laser light irradiation) of the photosensitive drum 1 in a main scan direction (generatrix direction) at a pixel corresponding to one mirror surface (side) and one horizontal (lateral) line (=one scanning). By this scanning exposure, an electrostatic latent image depending on objective image information is formed on the charged surface of the photosensitive drum 1 during the rotational operation.

A developing portion 4 deposits toner on the latent image on the surface of the photosensitive drum 1 and thus develops the latent image into a toner image on the photosensitive drum 1.

A sheet feeding portion 25 feeds an uppermost recording material P on a tray 11 to a transfer nip Pb. The transfer nip Pb is formed by the photosensitive drum 1 and a transfer roller 5. The recording material P is nipped and fed through the transfer nip Pb, and in a feeding process, the toner image is transferred from the surface of the photosensitive drum 1 onto the recording material P. A fixing nip Pd into which the recording material P carrying thereon an unfixed toner image is to be fed is formed by a pressing roller 23 and a cylindrical film 23 rotating in contact with a heater (unshown). The recording material P is heated while being nipped and fed through the fixing nip Pd, so that the toner image is heat-fixed on the recording material P.

The recording material P coming out of the fixing nip Pd is discharged to an outside of the image forming apparatus 100.

The image forming apparatus 100 has been required to output, as an image, the objective image information inputted from an unshown external device such as an image scanner or a computer. For that purpose, there is a need that a peripheral speed of the surface of the photosensitive drum 1 at the transfer nip Tb and a moving speed of the recording material P, onto which the toner image is to be transferred, at the transfer nip Pb coincide with each other. A scanning interval of the polygon mirror with respect to a sub-scan direction (circumferential direction) is always maintained at a constant level. For that reason, when the photosensitive drum 1 always rotates at a certain speed Vdrum, magnification of the toner image, formed on the photosensitive drum 1, with respect to the sub-scan direction is always constant.

However, when a moving speed Vpaper of the recording material P at the transfer nip Pb becomes slow, toner images on the surface of the photosensitive drum 1 are successively transferred onto the recording material P with rotation of the photosensitive drum 1, and therefore, the toner image is in a contracted state.

For example, the case where the electrostatic latent image is developed into the toner image on the surface of the photosensitive drum 1 with an interval of 10 mm with respect to the sub-scan direction will be considered.

In this case, when the recording material P moves 0.2% slow at the transfer nip Pb, during movement of the surface of the photosensitive drum 1 by 10 mm, the recording material P moves only by 9.8 mm. For that reason, an interval of the toner images actually transferred on the roller P is 9.8 mm with respect to the sub-scan direction, so that an image is contracted from the objective image information by 0.2% with respect to a feeding direction of the recording material P.

On the other hand, when the recording material P moves 0.2% fast, during movement of the surface of the photosensitive drum 1 by 10 mm at the transfer nip Pb, the recording material P moves by 10.2 mm. For that reason, an interval of the toner images actually transferred on the roller P is 10.2 mm with respect to the sub-scan direction, so that an image is expanded from the objective image information by 0.2% with respect to the feeding direction of the recording material P.

The actual moving speed Vpaper of the recording material P at the transfer nip Pb is not constant in some cases. This is attributable to action of various external forces on the recording material P when the recording material P is nipped and fed at the transfer nip Pb.

The external forces acting on the recording material P includes a frictional resistance received from the sheet feeding portion 25, a sliding resistance recessed from an entrance guide 28, a tensile force received from a fixing portion 6, and the like.

At the sheet feeding portion 25, a separation pad imparts the frictional resistance to the recording material P. Further, with respect to the feeding direction of the recording material P, the entrance guide 28 provided upstream of the transfer nip Pb imparts the sliding resistance to the recording material P. Further, with respect to the feeding direction of the recording material P, an entrance guide 27 provided upstream of the fixing nip Pd imparts the sliding resistance to the recording material P. These frictional and sliding resistances are external forces acting in a direction of preventing the feeding of the roller P.

At the fixing portion 6, in some instances, the pressing roller 23 thermally expands, so that a surface movement speed of the pressing roller 23 becomes relatively faster than the moving speed of the recording material P. In this case, at the instant when a leading end of the recording material P enters the fixing nip Pd, the recording material P receives the tensile force by a feeding force of the pressing roller 23.

In the case where the forces such as the frictional and the sliding resistances act in the direction of preventing the feeding of the roller P, the moving speed Vpaper of the recording material P gradually becomes slow, so that the toner image to be transferred onto the recording material P gradually contracts. On the other hand, in the case where the tensile force acts on the roller P and the moving speed Vpaper of the recording material P at the transfer nip Pb becomes fast, the toner image transferred on the recording material P expands.

Thus, with every change in external force exerted on the recording material P, the toner image transferred on the roller P expands or contracts.

Against such a problem, it would be considered that the moving speed of the recording material P is kept constant by changing a driving speed of a motor for driving the transfer roller on the basis of a detection result of a change in recording material feeding speed at the transfer nip. Thus, by maintaining the moving speed of the recording material at a constant level, it is possible to eliminate a deviation between the recording material feeding speed and the surface movement speed of the photosensitive drum always rotating at a certain speed. When this method is employed, expansion and contraction of the toner image transferred on the recording material P does not generate.

However, in order to realize the above-described method, there is a need to provide at least a motor for driving the photosensitive drum and a motor for driving the transfer roller. In the case where the exposure portion 3 is of a laser scanner type, there is also a need to provide a motor (scanner motor) for rotating the polygon mirror. In the image forming apparatus, in order to meet demands for downsizing and weight reduction and to achieve cost reduction, it has been required to reduce the number of the motors.

Japanese Laid-Open Patent Application (JP-A) 2012-98590 discloses an image forming apparatus capable of making a peripheral speed of a photosensitive drum surface and a moving speed of a recording material onto which a toner image is to be transferred substantially equal to each other. This image forming apparatus includes a main motor and a scanner motor, but is an apparatus being on the premise that the following phenomenon occurs. That is, the image forming apparatus is the apparatus being on the premise that the moving speed of the recording material becomes fast at timing when a leading end of the recording material enters the fixing portion, and from after the leading end of the recording material enters the fixing portion toward a trailing end portion of the recording material, the toner image transferred on the roller gradually expands in the sub-scan direction.

In recent years, in the image forming apparatus, with further speed-up of the image forming apparatus, it is required to suppress scattering of the toner image transferred from the surface of the photosensitive drum 1 onto the roller and to improve dot reproducibility. When there is a deviation between the peripheral surface of the photosensitive drum surface and the moving speed of the recording material, not only the image contracts and expands from the objective image information, but also an image density changes. When the image density changes, image non-uniformity generates in some cases.

In FIG. 14, (a) to (c) are schematic views each showing a state in which the image density changes depending on expansion and contraction of the image. Depending on a difference in resolution, a degree of the influence of the expansion and contraction of the image on the image non-uniformity varies. In FIG. 14, (a) shows the case where the resolution is low, and (b) and (c) show the case where the resolution is high. In FIG. 14, numerical values (%) represent the image densities.

First, (a) and (b) of FIG. 14 are compared with each other. Even when a half-tone image of 50%(image density) is intended to be outputted from an external device such as a computer, as shown in the figures, scattering or the like of the toner image generates in actuality, so that a dense image is formed. In the case of a low-resolution image as shown in (a) of FIG. 14, a size of matrix is larger than that in the case of a high-resolution image as shown in (b) of FIG. 14. For that reason, even when the peripheral speed of the photosensitive drum surface and the moving speed of the recording material are somewhat deviated from each other, a white portion is left, but a difference in image density (image darkness) is not conspicuous.

However, in the case where the high-resolution image is intended to be outputted as in (b) of FIG. 14 while meeting a demand for outputting thin lines and small characters in recent years, the size of the matrix is smaller than that in the case of the low-resolution image shown in (a) of FIG. 14. As shown in (a) to (d) of FIG. 15, irrespective of the resolution of the image and the magnification of the image, a degree (width) of the scattering of the toner image is unchanged. For that reason, in the case where in high-resolution printing, the image contracts during transfer, the white portion is largely covered with the toner, so that the image is seen so as to be dark (thick in image density).

A density error between a transfer image from the external device and the image outputted on the recording material in actuality can be eliminated to some extent by correction. Specifically, an actual output image density relative to the density of the image transferred from the external device (so-called, γ-curve) is measured in advance. Then, the image information transferred from the external device is subjected to correction.

For that reason, in the case where the image information which is the same as the image information in the case of (a) of FIG. 14 is transferred from the external device, in actuality, the correction is made as shown in (c) of FIG. 14. Specifically, in the case where the low-resolution image information is transferred with the image density of 50% as in (a) of FIG. 14, the image density is lowered to 37.5% while converting the resolution into a high resolution as in (c) of FIG. 14. By such correction, the density of an actually outputted image can be made equal to 60% similarly as in the case of (a) of FIG. 14. However, the image in (c) of FIG. 14 is the high-resolution image, and therefore when the expansion and contraction of the image generates, the degree of the influence on the image density is large. In the case of (a) of FIG. 14, the image density is 60% for the image which is not expanded and contracted, 65% for the contracted image and 55% for the expanded image. On the other hand, in the case of (c) of FIG. 14, the image density is 60% for the image which is not expanded and contracted, 75% for the contracted image and 45% for the expanded image. Although both of the contracted images shown in (a) and (c) of FIG. 14 are 60% in image density, it is understood that when the expansion and contraction generates, the image in (c) of FIG. 14 fluctuates in image density larger than the image in (a) of FIG. 14.

In the method disclosed in JP-A 2012-98590, the expansion and contraction of the toner image formed on the photosensitive drum surface cannot be faithfully conformed to a minute change in speed when the recording material is fed. For that reason, when the image with the resolution higher than ever is intended to be formed, the density non-uniformity generated in some instances.

SUMMARY OF THE INVENTION

A principal object of the present invention is to provide an image forming apparatus capable suppressing expansion and contraction of an image generating due to a change in external force exerted on a recording material and capable of outputting the image free from density non-uniformity.

According to an aspect of the present invention, there is provided an image forming apparatus comprising: a photosensitive member; an exposure portion configured to expose the photosensitive member to light depending on image information to form a latent image on the photosensitive member; a developing portion configured to develop the latent image into a toner image with toner; and a transfer portion configured to transfer the toner image from the photosensitive member onto a recording material, wherein the image forming apparatus changes a surface movement speed of the photosensitive member at timing prior to predetermined timing, when a moving speed of a recording material at the transfer portion changes, by a predetermined time.

According to another aspect of the present invention, there is provided an image forming apparatus comprising: a photosensitive member; an exposure portion configured to expose the photosensitive member to light depending on image information to form a latent image on the photosensitive member; a developing portion configured to develop the latent image into a toner image with toner; and a transfer portion configured to transfer the toner image from the photosensitive member onto a recording material, wherein the image forming apparatus changes an exposure interval by the exposure portion with respect to a sub-scan direction at timing prior to predetermined timing, when a moving speed of a recording material at the transfer portion changes, by a predetermined time.

Further features of the present invention will become apparent from the following description of exemplary embodiments with reference to the attached drawings.

DESCRIPTION OF THE EMBODIMENTS

In the following, embodiments of the present invention will be described with reference to the drawings. The following embodiments are an example of preferred embodiments of the present invention, but the present invention is not limited to the following embodiments. It is possible to replace constitutions with other constitutions within the scope of the concept of the present invention.

Embodiment 1

(Image Forming Apparatus)

Figure 1A:
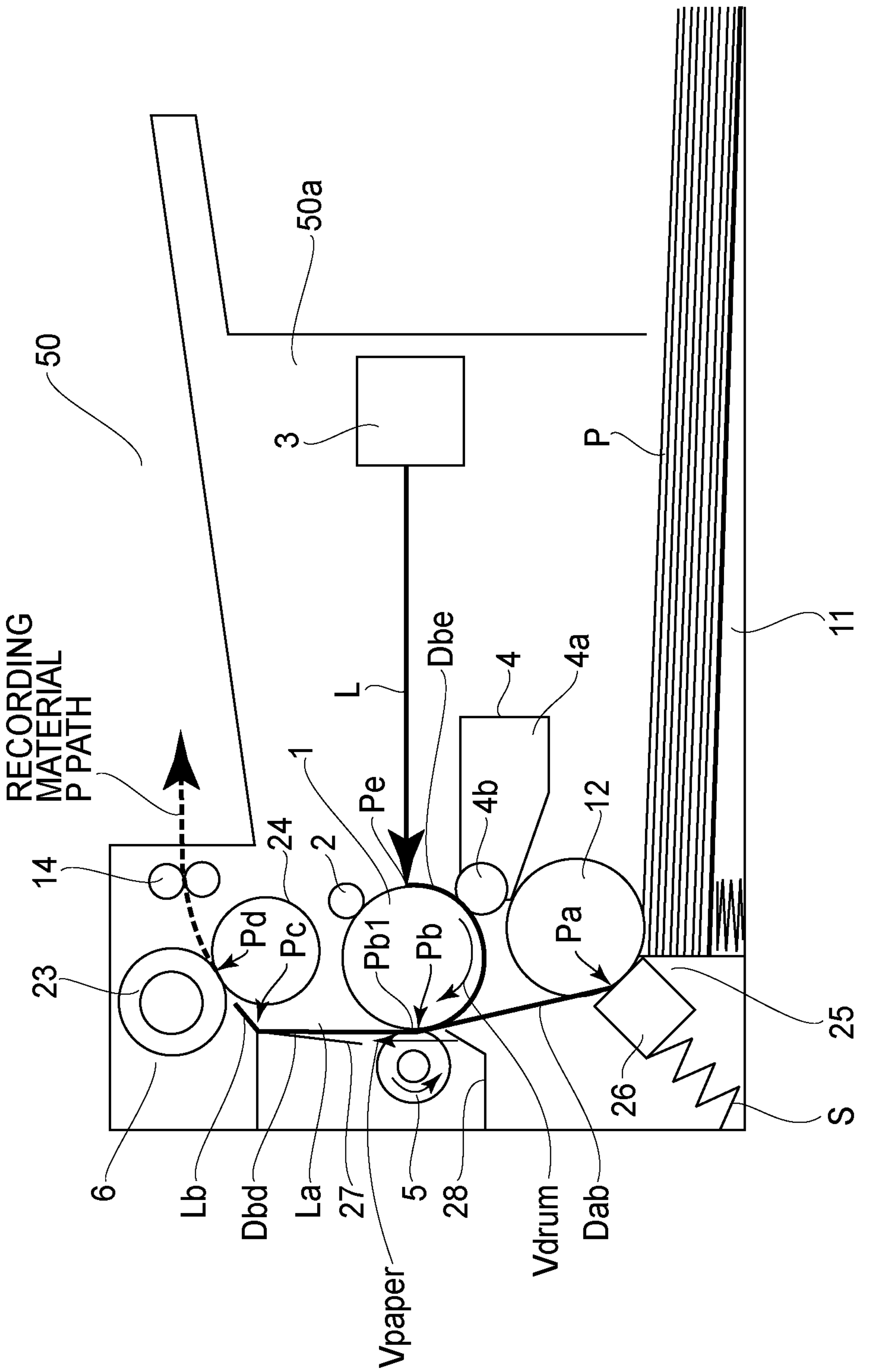
FIGS. 1A to 1C are schematic views for illustrating a structure of an image forming apparatus in Embodiment 1.
Figure 1B:
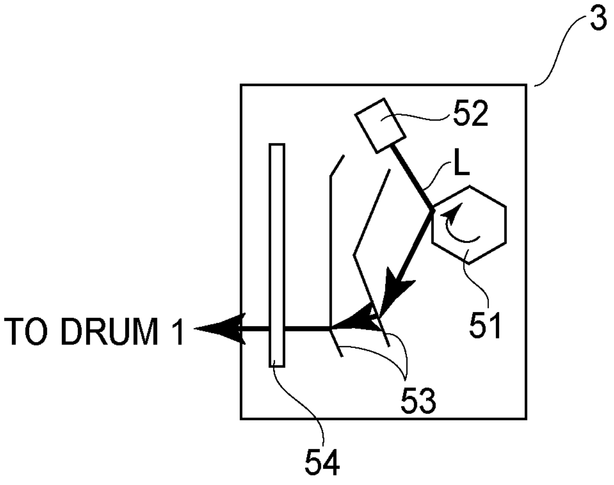
Figure 1C:
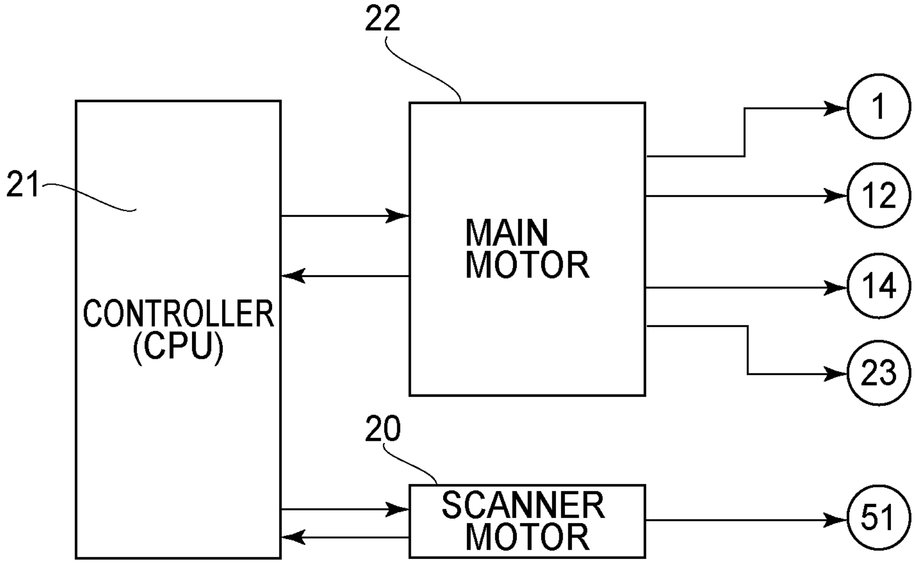

FIG. 1A is a sectional view showing a schematic structure of an example of an image forming apparatus (monochromatic printer in this embodiment) 50 using electrophotographic recording. FIG. 1B is a plan view showing a schematic structure of an exposure portion 3. FIG. 1C is a block diagram showing a driving system of a main motor 22 and a scanner motor 20.

The structure of the image forming apparatus in this embodiment will be described with reference to FIGS. 1A to 1C. In FIG. 1A, a broken line represents a feeding path of a recording material P (recording material P feeding path).

A photosensitive drum (image bearing member) 1 is rotated by driving the main motor 22 (FIG. 1C) by a control device (CPU) 21 effecting drive control of an image forming apparatus 50. An outer diameter of the photosensitive drum 1 is 20 mm. At a normal driving speed of the main motor 22, a moving speed (process speed) Vdrum of an outer peripheral surface of the photosensitive drum 1 is 200 mm/sec.

The surface of the photosensitive drum 1 is electrically charged uniformly to a predetermined polarity and a predetermined potential by a charging roller (charging portion) during a rotational operation.

An exposure portion 3 of a laser scanner type outputs laser light L ON/OFF-modulated correspondingly to an objective image information inputted from an unshown external device such as an image scanner or a computer. The laser light L emitted from a laser oscillator 52 shown in FIG. 1B is reflected by a polygon mirror 51 and is refracted by an fe lens 53, and reaches the photosensitive drum 1 via a reflecting mirror 54. The polygon mirror 51 is driven by the scanner motor (FIG. 1C). The photosensitive drum 1 is subjected to scanning exposure (irradiation) with the laser light L reflected by the polygon mirror 51 in a main scan direction (generatrix direction of the photosensitive drum 1).

The number of turns of the scanner motor 20 and output timing of the laser light L are controlled by the control device 21 so that a predetermined resolution can be obtained. In this embodiment, both of resolutions with respect to the main scan direction and the sub-scan direction (circumferential direction of the photosensitive drum 1) are controlled so as to be 1200 dpi.

By the scanning exposure by the exposure portion 3, an electrostatic latent image corresponding to the objective image information is formed on the surface of the photosensitive drum 1. An exposure position Pe on the surface of the photosensitive drum 1 is disposed upstream of a transfer nip (transfer position) Pb described later with respect to a rotational direction of the photosensitive drum 1. With reference to the circumferential direction of the surface of the photosensitive drum 1, a distance Dbe from a center Pb1 of the transfer nip Pb to the exposure position Pe is 31.4 mm (FIG. 1A).

A developing portion 4 deposits toner (developer), accommodated in a toner container 4*a*, on the latent image on the surface of the photosensitive drum 1 by using a developing sleeve 4*b*, so that the latent image is developed into a toner image.

The photosensitive drum 1, the charging roller 2 and the developing portion 4 are held by a frame (unshown) and are assembled into a unit as a cartridge (hereinafter referred to as CRG). This CRG is detachably mounted to an image forming apparatus main assembly 50*a* and can also be replaced with a new one as desired.

A roller 12 of a sheet feeding portion 25 of a pad type rotates on the basis of a start signal. The roller 12 separates the roller P one by one from a bundle of recording materials P stacked on a tray 11 and feeds the recording material P into the apparatus in cooperation with a separation pad (separating member) 26. The recording material P is introduced into the transfer nip Pb by an entrance guide 28. The entrance guide 28 is a guide for assisting entrance of the recording material P into the transfer nip Pb. The transfer nip Pb is formed by the photosensitive drum 1 and a transfer roller (transfer portion) 5 press-contacted to the photosensitive drum 1.

At the sheet feeding portion 25, a position Pa is a press-contact portion formed by the roller 12 and the separation pad 26 pressed to the surface of the roller 26 by a spring S. A distance from an exit of the press-contact portion Pa to a center Pb1 of the transfer nip Pb may preferably be short to the extent possible in order to meet speed-up of the apparatus. In this embodiment, a distance (linear distance) Dab from the exit of the press-contact portion Pa to the center Pb1 of the transfer nip Pb is 40 mm (FIG. 1A).

When a leading end of the recording material P enters the transfer nip Pb, also the toner image on the surface of the photosensitive drum 1 reaches the transfer nip Pb. The recording material P entering the transfer nip Pb is fed at a moving speed Vpaper by the photosensitive drum 1 (surface movement speed (peripheral speed): Vdrum) while being nipped and fed at the transfer nip Pb. In a feeding process, to the transfer roller 5, a predetermined transfer voltage (transfer bias) is applied from an unshown transfer bias applying voltage source. By applying the transfer bias to the transfer roller 5, the toner image is successively transferred from the surface of the photosensitive drum 1 onto the recording material P electrostatically.

In this embodiment, as the transfer roller 5, a roller prepared by coating a nickel-plated steel bar of 5 mm in diameter with a foam sponge of NBR (nitrile-butadiene rubber) adjusted to $5\times10^{7}\Omega$ in resistance was used. A resistance value is adjustable by mixing an electroconductive agent such as hydrin or carbon black into the NBR. An outer diameter of the foam sponge is 13 mm. A width of the foam sponge with respect to a direction (longitudinal direction) perpendicular to a feeding direction of the roller P is 216 mm on the assumption of a letter size as a maximum-sized recording material usable in the apparatus.

With a higher press-contact force of the transfer roller 5 to the photosensitive drum 1, the moving speed Vpaper of the recording material P at the transfer nip Pb more easily follows the surface movement speed Vdrum of the photosensitive drum 1. However, when the CRG is exchanged, a user is required to contact the photosensitive drum 1 to the transfer roller 5, and therefore when the press-contact force is excessively high, it becomes difficult to mount the CRG into the apparatus main assembly. For that reason, the press-contact force may preferably be 4.9-12.74 N (500-1300 gf). In this embodiment, the press-contact force was 9.8 N (1000 gf). With respect to the feeding direction of the recording material P, the width of the transfer nip Rb is about 1 mm.

The recording material P on which the toner image is transferred at the transfer nip Pb is separated from the surface of the photosensitive drum 1 and is fed toward a fixing portion 6 for feeding an unfixed toner image on the recording material P. The recording material carrying thereon the unfixed toner image T (FIG. 3) is introduced into a fixing nip Pd by an entrance guide 27. The entrance guide 27 is a guide for assisting entrance of the recording material P into the fixing nip Pd.

The fixing nip Pd is formed by a cylindrical film 24 incorporating a heater 241 (FIG. 3) and a pressing roller 23 pressed toward the heater 241 via the film 24. The film 24 is heated by the heater 241. The recording material P is nipped and fed by being pressed and heated at the fixing nip Pd, whereby the toner image is heat-fixed on the recording material P.

A distance Dbd from the transfer nip Pb to the fixing nip Pd may preferably be shortened for speed-up. However, when the distance from the transfer nip Pb to the fixing nip Pd is made excessively short, the CRG increases in temperature by the heat of the fixing portion 6, and causes a lowering in durability of constituent members of the CRG and a change in electric characteristic of the constitution members, so that there is a possibility that they constitute an obstacle to the above-described respective steps of charging, exposure, development and transfer.

In this embodiment, the distance Dbd between the transfer nip Pb and the fixing nip Pd is a distance (=50 mm) which is the sum of a rectilinear line La and a rectilinear line Lb. Here, the rectilinear line La is a line connecting a tangential line at the center Pb1 of the transfer nip Pb by the photosensitive drum 1 and an intersection point Pc at which the tangential line crosses the fixing entrance guide 27. The rectilinear line Lb is a line connecting the intersection point Pc and a center of the fixing nip Pd with respect to the feeding direction.

An interval between a preceding roller P and a subsequent recording material P fed next to the preceding recording material P is 45 mm (0.9 sec in the terms of time) so that 35 sheets of letter-sized paper are outputted in one minute at the process speed of 200 mm/sec. For that reason, a trailing end of the preceding recording material P passes through the transfer nip Pb, while the photosensitive drum 1 immediately prepares for the respective steps of charging, exposure, development and transfer for the subsequent recording material P.

The recording material P passed through the fixing portion 6 is discharged to an outside of the apparatus.

The above is a printing operation of the image forming apparatus 50.

Then, external forces having an influence on the moving speed Vpaper of the roller P at the transfer nip Pb will be described. Here, as the external forces, a frictional resistance by the separation pad (separating member) 26 of the sheet feeding portion 25 and a tensile force by a feeding force during thermal expansion of the pressing roller 23 of the fixing portion 6 exist.

(Frictional Resistance by Separation Pad 26)

Figure 2:
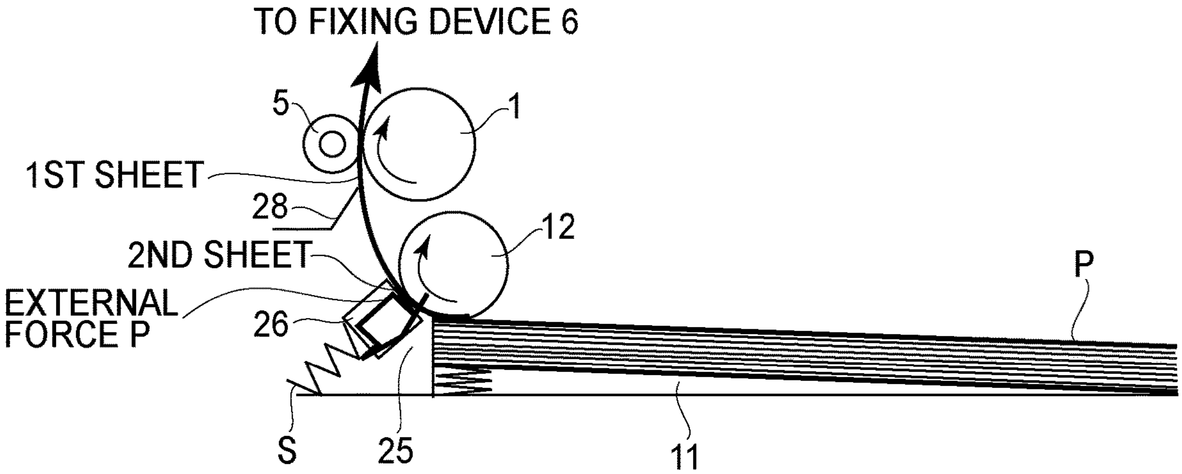
FIG. 2 is a sectional view showing a structure of a sheet feeding portion.

First, a structure of the sheet feeding portion 25 will be described while making reference to FIG. 2.

At the sheet feeding portion 25, the separation pad 26 is disposed opposed to the surface of the roller 12. Further, the separation pad 26 is pressed by the spring S and thus is press-contacted to the surface of the roller 12.

A size of the separation pad 26 is 10 mm in width with respect to the feeding direction of the recording material P and 40 mm in width with respect to the longitudinal direction perpendicular to the feeding direction of the recording material P. An outer diameter of the roller 12 is 20 mm. At the surfaces of the roller 12 and the separation pad 26, a material, such as a rubber, having a frictional property is used. For that reason, when the recording material P is fed by the roller 12, even when a plurality of recording materials P are fed simultaneously, a second and subsequent sheets (recording materials) are prevented from being fed by a frictional resistance with the separation pad 26 at the press-contact portion Pa. For this reason, only an uppermost (single) recording material P can be fed by the roller 12.

A contact pressure of the separation pad 26 to the roller 12 may preferably be 0.98-4.9 N (100-500 gf) when a balance between a state in which the recording material P cannot be fed and a double feeding state in which the recording materials are fed in a double feeding manner, which are in a trade-off relationship is taken into consideration. In this embodiment, the contact pressure was 3.43 N (350 gf).

The separation pad 26 is press-contacted to the roller 12 by the spring S in order to suppress the feeding of the second and subsequent recording materials P into the apparatus by being influenced by the first recording material P. For that reason, a constitution in which a frictional resistance is directly exerted, by the separation pad 26, on the first recording material P to be fed into the apparatus is employed. Alternatively, a constitution in which the frictional resistance is indirectly exerted on the first roller P by the separation pad 26 via the second recording material P is employed.

The moving speed Vpaper of the roller P at the transfer nip Pb is to coincide with the surface movement speed Vdrum of the photosensitive drum 1 since the recording material P is nipped and fed through the transfer nip Pb. However, the frictional resistance when the recording material P is nipped and fed by the transfer roller 5 and the photosensitive drum 1 is smaller than a frictional resistance exerted on the recording material P by the separation pad 26. For that reason, by the influence of the separation pad 26 on the recording material P, the moving speed Vpaper of the recording material P at the transfer nip Pb is slower than the surface movement speed Vdrum of the photosensitive drum 1.

By this influence, the toner image transferred on the recording material P is in a contracted state.

(Tensile Force by Feeding Force During Thermal Expansion of Pressing Roller 23)

Next, a tensile force generated, at the instant when the recording material P enters the fixing nip Pd, by thermal expansion of the pressing roller 23 of the fixing portion 6 will be described.

First, a structure of the fixing portion 6 will be described with reference to FIG. 3.

The heater 241 includes a substrate 241*a* of alumina in the form of a rectangular parallelepiped which is 6 mm in width with respect to the feeding direction of the recording material P, 270 mm in width with respect to the longitudinal direction perpendicular to the recording material feeding direction and 1 mm in thickness. On the surface of the substrate 241*a* in the film 24 side, a heat generating resistor 241*b* of Ag/Pd (silver/palladium) generating heat by energization is coated along the longitudinal direction by screen printing. A thickness of the heat generating resistor 251*b* is 10 μm. The heat generating resistor 241*b* is coated with gloss as a protective layer 241*c*. A thickness of the protective layer 241*c* is 50 μm.

A heater holder 240 as a holding member is formed of a LCP (liquid crystal polymer) of a heat-resistant resin material and may preferably be a low thermal capacity so as not to take heat from the heater 241. The heater 241 is engaged and held in a groove provided on the heater holder 240.

The film 24 is 18 mm in outer diameter in a cylindrical state in which the film 24 is not deformed. The film 24 has a multi-layer structure, and includes a base layer (unshown) for maintaining strength of the film 24 and a parting layer (unshown) provided on the surface of the base layer. A material of the base layer comprises a polyimide resin material having a heat-resistant property and a sliding-resistant property in combination and a carbon-based filler added in the polyimide resin material in order to improve thermal conductivity and strength. A material of the parting layer is a PFA (perfluoroalkoxy) resin material, excellent in parting property and heat-resistant property, of fluorine-containing resin materials.

The pressing roller 23 is disposed opposed to the heater 241 through the film 24. The heater holder 240 is pressed, at its end portions with respect to the longitudinal direction perpendicular to the feeding direction of the roller P, in a direction perpendicular to the generatrix direction of the film 24 by an unshown pressing mechanism, whereby an inner peripheral surface (inner surface) of the film 24 is press-contacted to the protective layer 241*c* of the heater 241.

The pressing roller 23 includes an iron-made core metal 230 of 11 mm in diameter and a 3.5 mm-thick elastic layer 232 formed with a silicone rubber on the surface of the core metal 230. When an outer diameter of the pressing roller 23 is small, the thermal capacitance can be suppressed. However, when the outer diameter of the pressing roller 23 is excessively small, the width of the fixing nip Pd with respect to the feeding direction of the recording material P becomes narrow, and therefore a proper diameter is needed. In this embodiment, the outer diameter of the pressing roller 23 was 18 mm. At the surface of the elastic layer 232, a parting layer 231 of PFA is provided.

With a lower surface hardness of the pressing roller 23, the width of the fixing nip Pd can be obtained at a lower pressing force (pressure), but when the surface hardness is excessively small, durability of the pressing roller lowers. In this embodiment, the surface hardness of the pressing roller 23 was 40° as Asker-C hardness (4.9 N (500 g-load)).

The width of the fixing nip Pd is larger with a larger pressing force of the heater holder 240 toward the pressing roller 23, so that a fixing property is improved, but an amount of deformation of the elastic layer of the pressing roller 23 becomes large, so that there is a possibility that durability of the elastic layer 232 is shortened. For that reason, the pressing force may preferably be about 49-294 N (5-30 kgf). In this embodiment, the pressing force was 147 N (15 kgf). At this time, the width of the fixing nip Pd with respect to the feeding direction of the recording material P is 7 mm.

The pressing roller 23 is rotated in an arrow direction by the main motor 22. The film 24 is rotated, by rotation of the pressing roller 23, in an arrow direction while sliding on the protective layer 241*c* of the heater 241 at the inner surface thereof.

To the elastic layer 232 of the pressing roller 23, heat of the heater 241 is conducted via the film 24, whereby the elastic layer 232 thermally expands. When the elastic layer 232 thermally expands, the outer diameter of the pressing roller 23 becomes large (23' in FIG. 3). For that reason, the feeding speed of the recording material P by the pressing roller 23 in which the elastic layer 232 thermally expands is faster than the feeding speed of the roller P by the pressing roller 24 before the elastic layer 232 thermally expands.

When printing is continued, a heat quantity is imparted to the elastic layer 232 of the pressing roller 23, and therefore, a thermal expansion amount of the elastic layer 232 further increases. Depending on the thermal expansion amount of the elastic layer 232, also the surface movement speed of the pressing roller 23 becomes fast. A width of a fixing nip Pdw formed by the film 24 and the pressing roller 23 which thermally expands and increases in surface movement speed is broader than the width of the fixing nip Pd formed by the film 24 and the pressing roller 23 before the thermal expansion. At the instant when the recording material P enters the broad fixing nip Pdw, a tension force by a feeding force of the pressing roller 23 acts on the recording material P.

Further, the width of the fixing nip Pdw when the pressing roller 23 thermally expands is broader than the width of the fixing nip Pd before the pressing roller 23 thermally expands, and therefore, the pressing force exerted on the recording material P at the broad fixing nip Pdw is stronger than the pressing force exerted on the recording material P at the transfer nip Pb. For that reason, a gripping force for gripping the recording material P by the pressing roller 23 at the fixing nip Pdw is stronger than that at the transfer nip Pb.

For this reason, the moving speed Vpaper of the recording material P at the transfer nip Pb is dominated by the surface movement speed (peripheral speed) of the pressing roller 23 after the leading end of the recording material P enters the fixing nip Pdw. That is, from the instant when the recording material P enters the fixing nip Pdw, the moving speed Vpaper of the recording material P becomes faster than the surface movement speed Vdrum of the photosensitive drum 1. In this case, the moving speed Vpaper of the recording material P is faster than the peripheral speed of the surface of the photosensitive drum 1 at the transfer nip Pb, so that the toner image transferred on the recording material P is in an expanded state.

(Rotational Drive Control)

As shown in FIG. 1C, the number of motors provided in the image forming apparatus 50 in this embodiment is two, i.e., the scanner motor 20 and the main motor 22. Each of these motors 20 and 22 is rotationally driven by the control device (CPU) 21.

The scanner motor 20 for rotating the polygon mirror 51 is controlled by the control device 21 so as to maintain a certain speed.

On the other hand, a driving speed of the main motor 22 can be changed by the control device 21. A rotational driving force of the main motor 22 is transmitted to each of the roller 12, the photosensitive drum 1, the pressing roller 23 and a roller 14 via an unshown power transmitting mechanism. That is, when the driving speed of the main motor 22 is reduced in order to reduce the surface movement speed Vdrum of the photosensitive drum 1, the speeds of the roller 12, the pressing roller 23 and the roller 14 are reduced with the same ratio as that of the main motor 22.

The transfer roller 5 is rotated by the rotation of the photosensitive drum 1 in the case where there is no roller P at the transfer nip Pb. For that reason, the change in moving speed Vpaper of the recording material P at the transfer nip Pb can be suppressed by the transfer roller 5. However, in the case where the recording material P exists at the transfer nip Pb, the transfer roller 5 is rotated by the recording material P, moving at the moving speed Vpaper, fed by the rotation of the photosensitive drum 1.

(Rotational Speed Change of Main Motor 22 and Timing Thereof)

As described above, the moving speed Vpaper of the roller P at the transfer nip Pb is changed by the external force exerted on the recording material P, so that the toner image transferred on the recording material P expands or contracts or causes density non-uniformity. In order to suppress the expansion and contraction and the density non-uniformity of the toner image generated by the external force exerted on the recording material P, there is a need that the peripheral speed of the photosensitive drum 1 and the moving speed of the recording material P are caused to coincide with each other.

A method thereof will be described by taking, as an example, the case where horizontal lines are drawn on the recording material P with intervals of 10 mm with respect to the feeding direction of the roller P.

For example, it is assumed that the external force exerted on the recording material P is a force exerted in a direction of preventing the feeding of the recording material and that the moving speed Vpaper of the recording material at the transfer nip Pb is always 2% slower than a normal speed (process speed: 200 mm/sec). In this case, during movement of the surface of the photosensitive drum 1 by 10 m, the recording material P moves only by 9.8 mm, and therefore, the toner image transferred on the recording material is 9.8 m in interval, so that the toner image is contracted more than a normal image Against this phenomenon, the surface movement speed Vdrum of the photosensitive drum 1 at the transfer nip Pb is increased by 2%. Then, a scanning exposure interval of the polygon mirror 51 at the exposure portion 3 is constant, and therefore, an interval of a latent image, with respect to a sub-scan direction, formed on the surface of the photosensitive drum 1 is 10.2 mm (10 mm in the case of a normal speed). This latent image is developed into the toner image by the developing portion 4, so that the toner image on the surface of the photosensitive drum 1 is in a state in which the interval of the toner image is expanded to 10.2 mm. Further, even when the surface movement speed Vdrum of the photosensitive drum 1 is increased by 2%, a relative speed of the recording material P to the surface movement speed Vdrum of the photosensitive drum 1 is in a state in which the relative speed is slower than the surface movement speed Vdrum by 2%.

When the rotational driving speed of the main motor 22 is increased by 2%, also the speeds of the roller 12, the pressing roller 23 and the roller 14 are increased with the same ratio, and therefore, also the moving speed Vpaper of the recording material P at the transfer nip Pb is increased by 2%. That is, a correlation between the surface movement speed Vdrum of the photosensitive drum 1 and the moving speed Vpaper of the recording material P at the transfer nip is unchanged.

There is a possibility that a magnitude of the external force exerted on the recording material P is changed by the change in moving speed Vpaper of the recording material P at the transfer nip Pb. However, it would be considered that the change in external force is small, so that the influence thereof is sufficiently negligible. Accordingly, by expanding the interval of the toner image, formed on the surface of the photosensitive drum 1, to 10.2 mm in advance, the recording material P moves in a length of almost 10 mm during movement of the photosensitive drum surface at the transfer nip Pb by 10.2 mm. For that reason, on the recording material P, it is possible to draw the horizontal lines with objective intervals of 10 mm.

Here, it is to be noted that timing when the surface movement speed Vdrum of the photosensitive drum 1 at the transfer nip Pb is not the same as timing when the external force exerted on the recording material P changed. In order to change the image interval of the toner image on the surface of the photosensitive drum 1 with respect to the sub-scan direction, there is a need to change a formation interval of the latent image at the time when the latent image is formed on the photosensitive drum surface.

Figure 4:
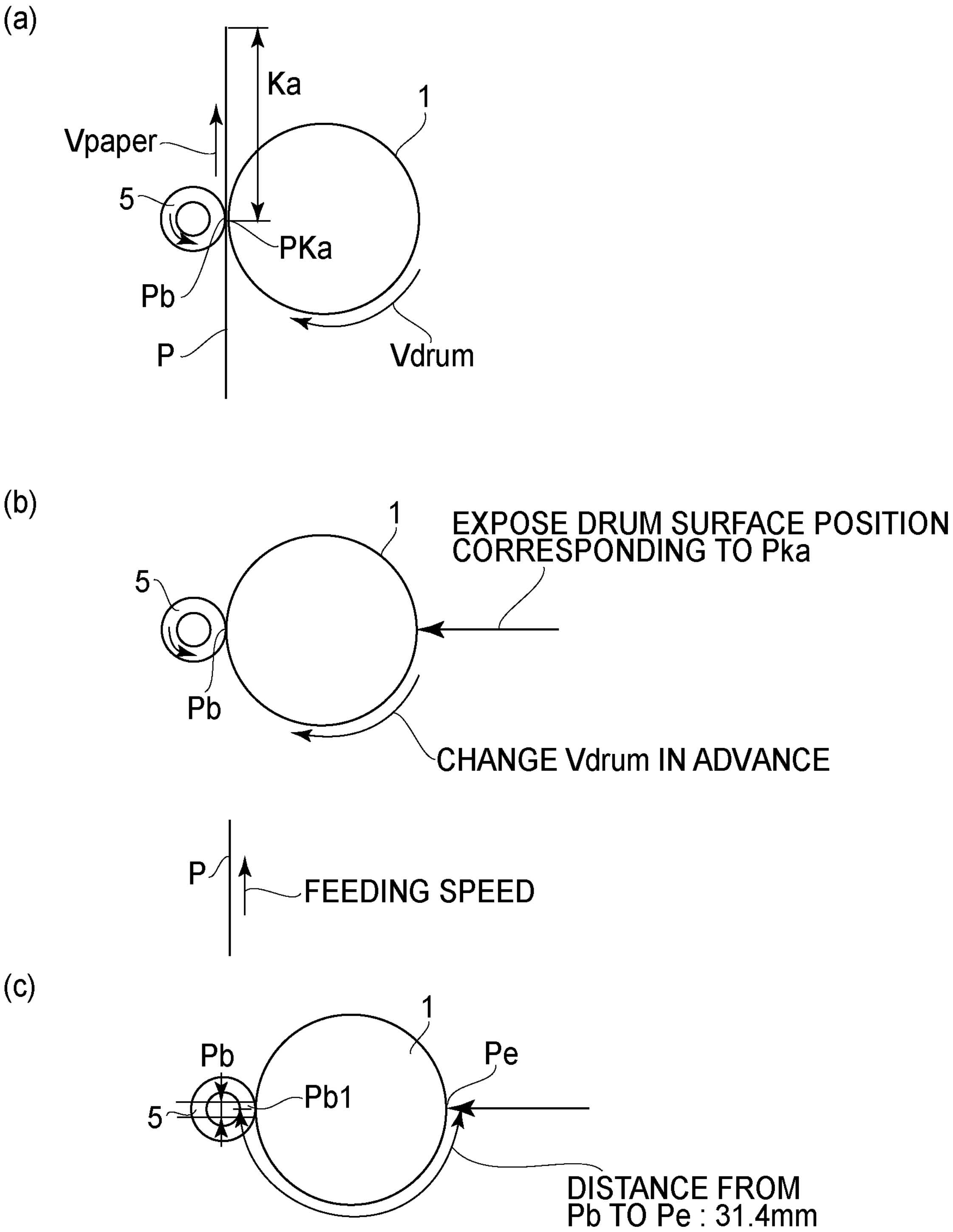
In FIG. 4, (a) to (c) are schematic views for illustrating timing when a surface movement speed of the photosensitive drum is changed.

FIG. 4 shows an image of timing of changing the surface movement speed Vdrum of the photosensitive drum 1.

Figure 6:
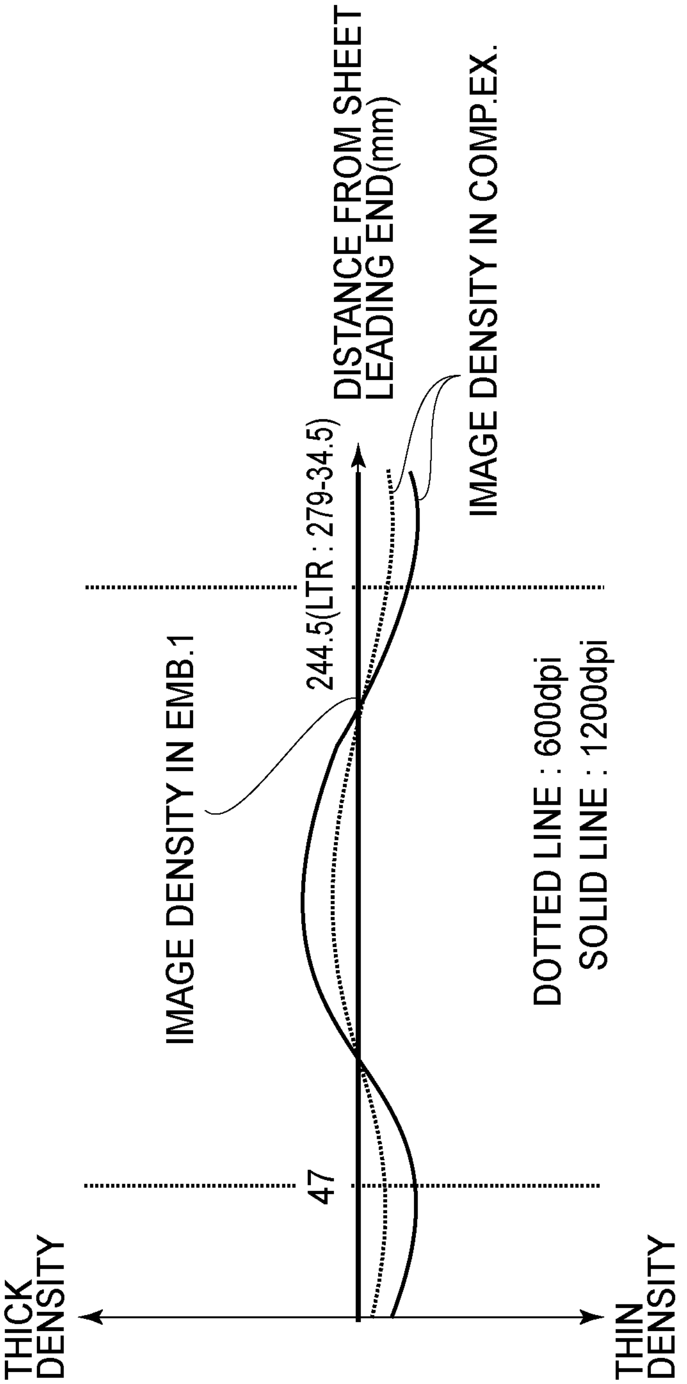
FIG. 6 is a schematic view showing a comparison result of image density non-uniformity of output images in the image forming apparatuses in Embodiment 1 and the comparison example.

For example, the case where timing when the moving speed Vpaper of the recording material P at the transfer nip Pb is changed by the external force is the time when a recording material position PKa spaced from the leading end of the recording material P by a distance Ka moves through the transfer nip Pb will be considered ((a) of FIG. 6).

In this case, there is a need to change the surface movement speed Vdrum of the photosensitive drum 1 in advance at timing before the position of the photosensitive drum surface overlapping with the above-described recording material position PKa passes through an exposure position Pe ((b) of FIG. 4). Here, the change in surface movement speed Vdrum of the photosensitive drum 1 is on the basis of the time of a start of exposure of the surface of the photosensitive drum 1 at the exposure portion 3. That is, the timing of changing the surface movement speed Vdrum of the photosensitive drum 1 is timing before timing, when the external force exerted on the recording material P actually changes, by a time corresponding to a distance from the center Pb1 of the transfer nip Pb to the exposure position Pe ((c) of FIG. 4).

(Change in Surface Movement Speed Vdrum of Photosensitive Drum 1)

Figure 5:
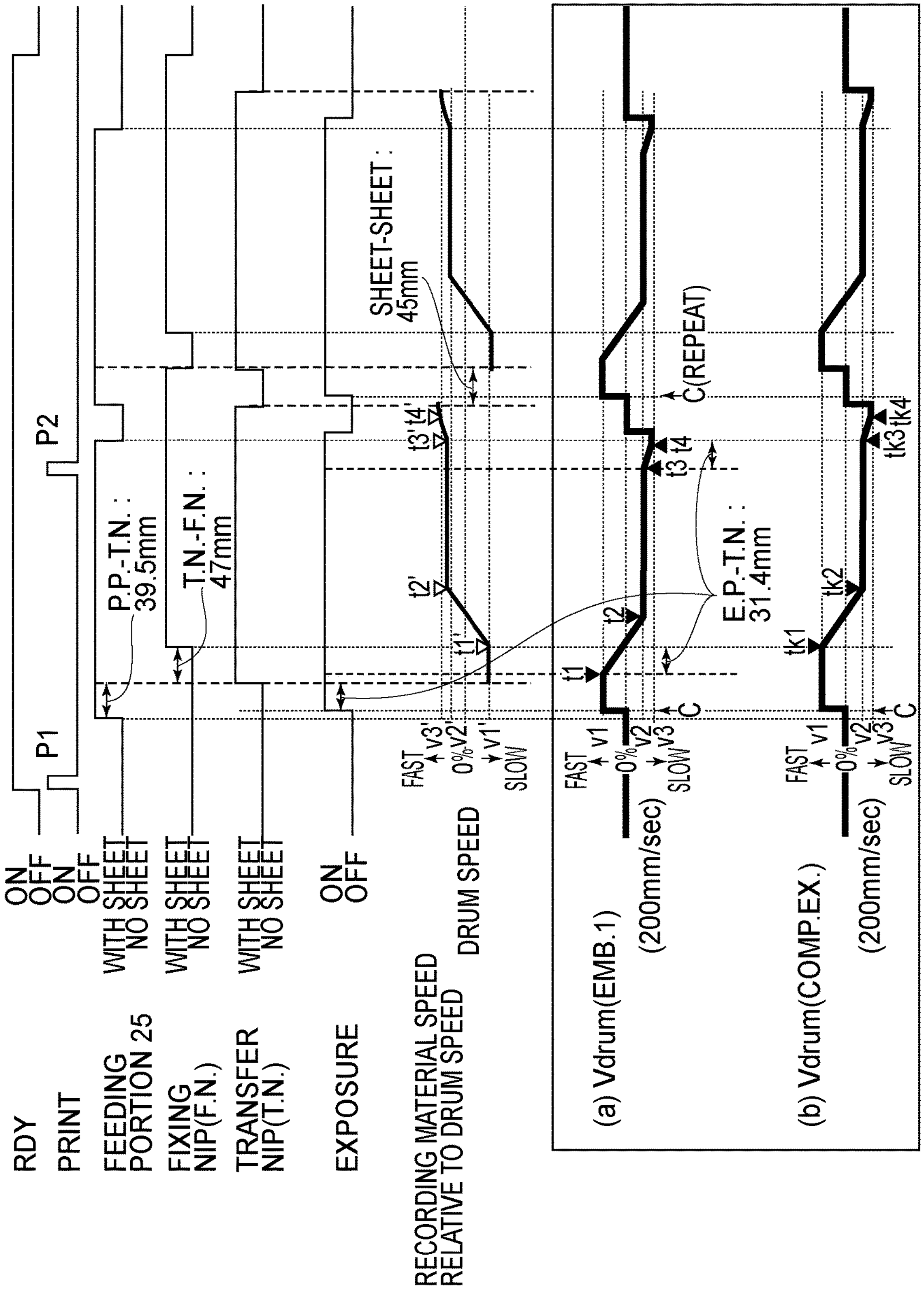
FIG. 5 is a timing chart showing change timing of the surface movement speed of the photosensitive drum in the image forming apparatus in Embodiment 1 and in an image forming apparatus in a comparison example.

FIG. 5 shows a timing chart for illustrating a change in surface movement speed Vdrum of the photosensitive drum 1 in the image forming apparatus in each of this embodiment and the comparison example. In FIG. 5, the case where two sheets P1 and P2 ("Xerox Multi-purpose White Papers", LTR size, 75 g/m$^2$) are subjected to continuous printing is shown.

As shown in FIG. 5, the relative moving speed of the recording material P1 to the surface movement speed of the photosensitive drum 1 gradually increases in the order of v1', v2' and v3'.

When the printer is in a print-ready state (RDY=ON) and a print signal is inputted (PRINT=ON), feeding of the recording material from the sheet feeding portion 25 starts. As described above, the frictional resistance by the separation pad 26 acts on the recording material after the feeding. For that reason, even when the recording material P1 reaches the transfer nip Pb, the relative moving speed of the recording material P1 to the surface movement speed of the photosensitive drum 1 is negative (minus) (v1'). This state continues until the leading end of the recording material P1 reaches the fixing nip Pd. Incidentally, a distance between an exit of a press-contact nip Pa and an entrance of the transfer nip Pb is (distance Dab (40 mm))−(length of ½ of width (1 mm) of transfer nip Pb (i.e., 0.5 mm))=39.5 mm. A distance between the entrance of the transfer nip Pb and an entrance of the fixing nip Pd is (distance Dbd (50 mm))+(length of ½ of width (1 mm) of transfer nip Pb (i.e., 0.5 mm))−(length of ½ of width (7 mm) of fixing nip Pd (i.e., 3.5 mm))=47 mm.

At timing t1', the leading end of the recording material P1 enters the fixing nip Pd. At this time, the recording material P1 is also nipped at the press-contact portion Pa and the transfer nip Pb. Further, the pressing roller 23 is assumed to be in a state in which a peripheral speed thereof is increased by expansion of the elastic layer 232. At the timing t1' when the leading end of the recording material P1 enters the fixing nip Pd, by a relative speed difference between the surface movement speed of the pressing roller 23 at the fixing nip Pd and the moving speed of the recording material P1 at the transfer nip Pb, the pressing roller 23 instantaneously applies a tensile force to the recording material P1. As a result, the relative moving speed of the recording material P1 to the surface movement speed of the photosensitive drum 1 at the transfer nip Pb gradually increases from the timing t1' to timing t2' being a steady state, and thus changes from the speed v1' to the speed v2'.

The time from a start of acceleration at the timing t1' to the steady state at the timing t2' depends on not only a friction coefficient of members nipping the recording material P and a recording material nipping force but also a basis weight and a friction coefficient of the recording material P. Here, the members nipping the recording material P refer to the separation pad 26 and the roller 12, the photosensitive drum 1 and the transfer roller 5, and the pressing roller 23 and the film 24. In this embodiment, the above-described time was 0.3 sec (corresponding to 60 mm in distance) in the case where the sheets ("Xerox Multi-purpose White Papers", LTR size, 75 g/m$^2$) were used.

Next, at timing t3' when the trailing end of the recording material P passed through the sheet feeding portion 24 and the frictional resistance of the separation pad 26 is eliminated, the force with respect to the direction of preventing the feeding of the recording material P is abruptly eliminated, and therefore, it seems that a force acts on the recording material P in the feeding direction. That is, also in this state, a force with respect to the tensile direction is exerted on the recording material P. The relative moving speed of the recording material P to the surface movement speed of the photosensitive drum 1 at the transfer nip Pb gradually increases from the timing t3' to timing t4' (timing immediately before the trailing end of the recording material P passes through the transfer nip Pb), and thus changes from the speed v2' to the speed v3'.

The time from a start of acceleration at the timing t3' to a steady state at the timing t4' was 0.1 sec (corresponding to 20 mm in distance). Here, the timing t4' is timing immediately before the trailing end of the recording material P passes through the transfer nip Pb.

Thus, by the change in external force exerted on the recording material P, the relative moving speed of the recording material P to the surface movement speed of the photosensitive drum 1 changes.

In an image forming apparatus in a comparison example, the driving speed of the main motor 22 is changed at timing tk1 corresponding to the above-described timing t1'. Similarly, the pressing speed of the main motor 22 is changed at timings tk2, tk3 and tk4 corresponding to the timings t2', t3' and t4', respectively.

In the image forming apparatus in the comparison example, the toner image formed on the photosensitive drum surface is gradually contracted in the sub-scan direction by continuously reducing the surface movement speed of the photosensitive drum from after the leading end of the recording material enters the fixing nip to the trailing end portion of the recording material. Originally, as regards the image, on the recording material, having a tendency to expand in the sub-scan direction, an expanding phenomenon of the image can be suppressed by contracting the toner image, formed on the photosensitive drum surface, in the sub-scan direction.

A feature of the image forming apparatus in this embodiment is such that the surface movement speed of the photosensitive drum 1 is changed at the timing t1 prior to the timing t1', when the external force exerted on the recording material P changes, by the time corresponding to the distance of 31.4 mm from the exposure position Pe of the photosensitive drum 1 surface at the exposure portion 3 to the center of the transfer nip Pb with respect to the widthwise direction.

For that purpose, the driving speed of the main motor 22 is changed in advance from the timing t1 prior to the timing t1' by the time corresponding to the distance of 31.4 mm. As a result, an image interval (image size) of the toner image, with respect to the sub-scan direction, transferred onto the roller at the timing t1' when the recording material P is started to be accelerated is to be properly contracted already at timing of exposure when the electrostatic latent image is formed on the photosensitive drum surface.

Similarly, also as regards the timings t2', t3' and t4' when the moving speed of the roller P changes, the surface movement speed of the photosensitive drum 1 is changed in advance at the timings t2, t3 and t4 prior to the timings t2', t3' and t4', respectively, by the time corresponding to the distance of 31.4 mm. As regards the timings t1' to t4' when the external force exerted on the recording material P changes on the basis of the timing when the leading end of the recording material P entered the transfer nip Pb, the driving speed of the main motor 22 may only be required to be changed at the timings t1 to t4, respectively, which are taken into consideration on the exposure start timing basis.

The timing t1' is timing when the leading end of the recording material P enters the fixing nip Pd and is timing when the leading end of the polygon mirror P moves in a distance of 47 mm from passing thereof through the entrance of the transfer nip Pb. The timing t1 when the driving speed of the main motor 22 is started to be changed is timing prior to the timing t1' by the time corresponding to 31.4 mm, and is timing after 0.235 sec from the start of the exposure.

The timing t2' is timing after 0.3 sec (corresponding to 60 mm in distance) from the timing t1' as described above. The timing t2 when the driving speed of the main motor 22 is started to be in the steady state is timing prior to the timing t2' by the time corresponding to 31.4 mm, and is timing after 0.535 sec from the start of the exposure.

The timing t3' is timing when the trailing end of the recording material P passes through the sheet feeding portion 25 and is timing when a distance in which the trailing end of the polygon mirror P reaches the exit of the transfer nip Pb is 39.5 mm. In the case where the LTR-sized paper of 279 mm in length with respect to the recording material feeding direction is used as the recording material P, the timing t3' is timing when the leading end of the LTR-sized paper moves in a distance of 239.5 mm from passing thereof through the entrance of the transfer nip Pb. The timing t3 is timing prior to the timing t3' by the time corresponding to 31.4 mm, and is timing after 1.193 sec from the start of the exposure.

The timing t4' is timing after 0.1 sec (corresponding to 20 mm in distance) from the timing t3' as described above. The timing t4 when the driving speed of the main motor 22 is started to be in the steady state is timing prior to the timing t4' by the time corresponding to 31.4 mm, and is timing after 1.243 sec from the start of the exposure.

Incidentally, in preparation for printing on the second sheet in the continuous printing, the surface movement speed of the photosensitive drum 1 may also be returned to the normal speed (200 mm/sec) at timing (timing prior to the timing, when the trailing end of the recording material P1 passes through the transfer nip Pb, by the time corresponding to the distance between the transfer nip and the exposure position) when the exposure step for the first sheet is ended. An interval from the end of the latent image formation corresponding to the trailing end portion of the preceding recording material P1 by the exposure portion 3 to the start of the latent image formation corresponding to the leading end portion of the subsequent recording material P2 is 45 mm. During the interval of 45 mm, the surface movement speed of the photosensitive drum 1 is returned to the normal speed, so that it is possible to repeat the respective steps of the charging, the exposure, the development and the transfer again from the timing indicated by C in FIG. 5.

(Effect of this Embodiment)

In the image forming apparatus in the comparison example, the surface movement speed of the photosensitive drum at the transfer nip Pb was changed at the timing t1' when the external force on the recording material changed.

As in the comparison example, it is assumed that the surface movement speed of the photosensitive drum 1 is reduced at the timing t1' when the external force exerted on the recording material changes and thus the moving speed of the recording material at the transfer nip Pb changes. In this case, magnification of the toner image which has already been formed in a region of the distance of 31.4 mm between the exposure position and the transfer nip on the photosensitive drum surface cannot be changed.

Accordingly, in a control method in the comparison example, there is a period in which the moving speed of the photosensitive drum surface and the moving speed of the recording material do not coincide with each other. Further, in a region corresponding to the period, the density (darkness) of the image on the recording material changes.

The control method of the surface movement speed of the photosensitive drum in this embodiment and the comparison example will be described. Comparison items are an image density and a difference in image density non-uniformity when a 50%-half-tone image is outputted on a whole surface of the letter-sized sheet at 600 dpi and 1200 dpi, Table 1 shows a comparison result of the image density change. In the case where there is substantially no image density change, evaluation of "o" is made, and in the case where the image density change is conspicuous, evaluation of "x" is made.

TABLE 1

| Resolution | 600 dpi | 1200 dpi |
|---|---|---|
| Comp. Ex. | ○ | x |
| Emb. 1 | ○ | ○ |

FIG. 6 shows a comparison result of the image density non-uniformity. At the resolution of 600 dpi, the image density non-uniformity is not conspicuous, but at the resolution of 1200 dpi, the image density non-uniformity (difference) is conspicuous. For that reason, in the region where the peripheral speed of the photosensitive drum and the moving speed of the recording material do not coincide with each other, the image density non-uniformity becomes conspicuous.

According to the method in this embodiment, in the entire region of the recording material P, it becomes possible to suppress a fluctuation in image magnification. For that reason, even in the image with a high resolution, it is possible to substantially eliminate the image density non-uniformity.

In the image forming apparatus 50 in this embodiment, the surface movement speed of the photosensitive drum 1 is changed in advance of the change in external force exerted on the roller P. The timing when the surface movement speed of the photosensitive drum 1 is changed is the timings t1 to t4 prior to the timings t1' to t4', respectively, when the external force changes, by the time corresponding to the distance between the exposure position and the transfer nip.

That is, the surface movement speed of the photosensitive drum 1 is changed from the timings t1 to t4 prior to the timings t1' to t4', respectively, when the external force exerted on the recording material P changes and thus the moving speed of the recording material P at the transfer nip starts to change.

As a result, it is possible to suppress the expansion and contraction of the image generating due to the change in external force exerted on the recording material P, so that the image free from the density non-uniformity can be outputted.

The timing of changing the surface movement speed of the photosensitive drum 1 is not limited to the timing prior to the external force changing timing by the time corresponding to the distance between the exposure position and the transfer nip. For example, the recording material P is curved (flexed) in some cases depending on the kind of the recording material P and the structure of the image forming apparatus. As disclosed in JP-A 2000-181262, there is a constitution in which a recording material feeding path is distorted toward the film 24 side of the fixing portion 6 by increasing an entering amount of the entrance guide 27 into the roller feeding path in order to suppress generation of creases and image fluctuation on the recording material P by the fixing portion 6. In such a constitution, due to stiffness of the recording material P, the recording material P is liable to curve.

It is assumed that the curve of the recording material generates in the feeding path from the transfer nip Pb to the fixing portion 6 by a large entering amount of the entrance guide 27 into the feeding path.

In this case, even when the leading end of the recording material P enters the fixing nip Pd, the tensile force of the recording material by the pressing roller 23 does not change the moving speed of the recording material P at the transfer nip immediately. After the curve of the recording material P is eliminated, the moving speed of the recording material P at the transfer nip Pb is increased. That is, the moving speed of the recording material P at the transfer nip Pb is to be changed at timing somewhat later than timing (t1' in FIG. 5) assumed that the leading end of the recording material P enters the fixing nip Pd.

In such a case, the surface movement speed of the photosensitive drum 1 may also be started to be changed at timing somewhat later than the timing t1'.

Thus, the timing of changing the surface movement speed of the photosensitive drum 1 may be properly changed depending on the structure of the image forming apparatus and the kind of the recording material P. The timing may only be required to be timing in the neighborhood of the timing t1 and to be timing prior to the timing t1' when the external force exerted on the recording material P actually changes.

As a result, it becomes possible to suppress the expansion and contraction of the image due to a deviation between the surface movement speed of the photosensitive drum 1 at the transfer nip Pb and the moving speed of the recording material P.

Embodiment 2

Another embodiment of the image forming apparatus 50 will be described. A feature of the image forming apparatus 50 in this embodiment is that double-side printing can be carried out using a reversing mechanism (reversing portion) 17 for turning the recording material P upside down and that the change in surface movement speed of the photosensitive drum 1 is different between the first side and the second side.

Figure 7:
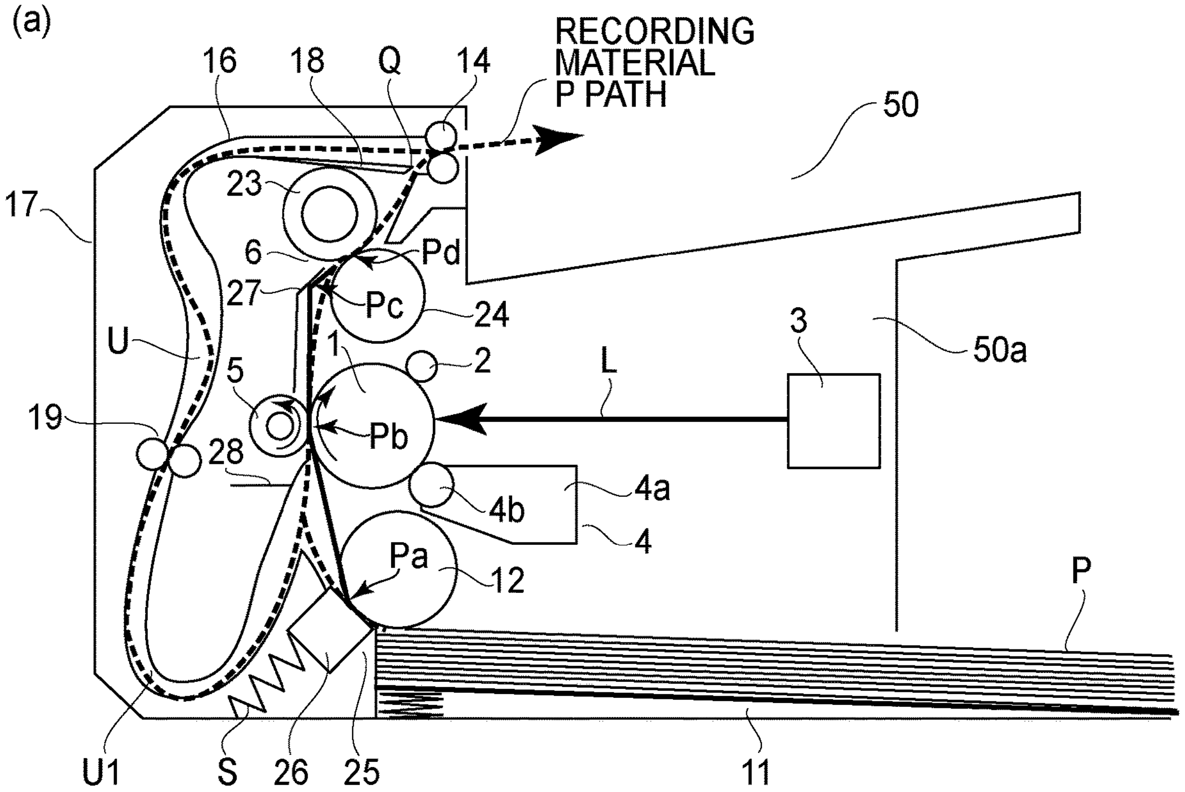
In FIG. 7, (a) and (b) are schematic views for illustrating a structure of an image forming apparatus in Embodiment 2.
Figure 7:
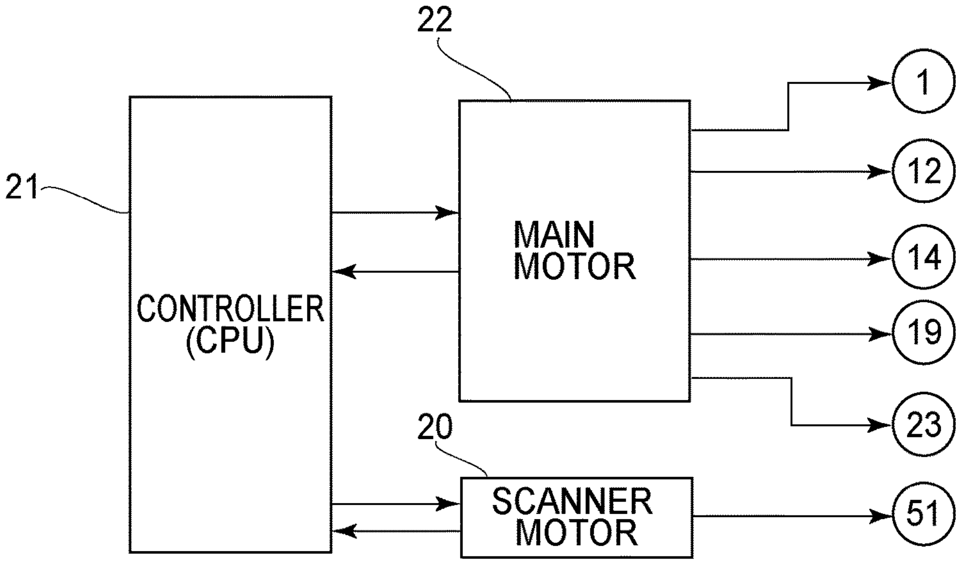

In the following, the structure of the image forming apparatus 50 will be described with reference to FIG. 7. In FIG. 7, (a) is a sectional view showing a schematic structure of the image forming apparatus 50 in this embodiment, and (b) is a block diagram showing a driving system of a main motor 22 and a scanner movement 20.

In this embodiment, members which are the same as those in Embodiment 1 are represented by the same reference numerals or symbols and will be omitted from description.

The reversing mechanism 17 includes an introducing guide 18 provided between the fixing portion 6 and the roller 14, a feeding guide 16 for forming a feeding path U for reversing the recording material P from the introducing guide 18, and a roller 19 for nipping and feeding the recording material P in the feeding path of the feeding guide 16.

In the case where the recording material P is subjected to the double-side printing, after the printing on the first side is ended and the trailing end of the recording material P passes through a free end Q of the introducing guide 18, the roller 14 is reversely rotated, so that the recording material P is guided to the roller 19 along the feeding path U of the feeding guide 16.

The roller 19 is rotated by drive of the main motor 22. The surface movement speed of the roller 19 is set so as to be equal to the surface movement speed of the photosensitive drum 1. The recording material P nipped and fed by the roller 19 passes through a substantially U-shaped reversing path U1 provided in the feeding path U of the feeding guide 16 in order to transfer the toner image on the second side (which is a non-printed side opposite from the first side) of the recording material P. Then, the recording material P is introduced into the transfer nip Pb again with the second side toward the photosensitive drum 1 side by the entrance guide 28.

Then, the recording material P is nipped and fed through the transfer nip Pb, and in the feeding process, a predetermined transfer voltage is applied to the transfer roller 5, so that the toner image on the surface of the photosensitive drum 1 is transferred onto the second side of the recording material P.

The recording material P carrying thereon the unfixed toner image T on the second state side is introduced into the fixing nip Pd of the fixing portion 6 by the entrance guide 27. The recording material P is nipped and fed through the fixing nip Pd, whereby the toner image on the second side of the roller P is heat-fixed on the recording material P.

The recording material P coming cut of the fixing portion 6 is discharged to an outside of the apparatus.

Thus, in the case where the recording material P is subjected to the double-side printing, the feeding path is different between during first-side printing on the recording material P and during second-side printing on the recording material P. Further, also the external force having the influence on the moving speed of the recording material P at the transfer nip Pb is different between during first-side printing and during second-side printing.

The recording material P is not subjected to the frictional resistance by the separation pad 26 since the recording material P does not pass through the sheet feeding portion 25 during second-side printing on the recording material P. For that reason, during first-side printing, the moving speed of the recording material P at the transfer nip Pb was slower than the surface movement speed of the photosensitive drum 1 until the leading end of the recording material P enters the fixing nip Pd. However, during second-side printing, the surface movement speed of the photosensitive drum 1 and the moving speed of the recording material P coincide with each other until the leading end of the recording material P enters the fixing nip Pd.

Further, during first-side printing, even after the leading end of the recording material P enters the pressing roller 23, a force by the sheet feeding portion 25 acted on the recording material P for a while. However, during second-side printing, the force does not act on the recording material P. Further, during second-side printing, there is no frictional resistance by the separation pad 26 exerted on the recording material P during first-side printing, and therefore, during second-side printing, the moving speed of the recording material P at the transfer nip Pb at the time when the recording material leading end enters the fixing nip is faster than that during first-side printing.

Accordingly, there is a need to change the surface movement speed of the photosensitive drum 1 between during first-side printing and during second-side printing.

Figure 8:
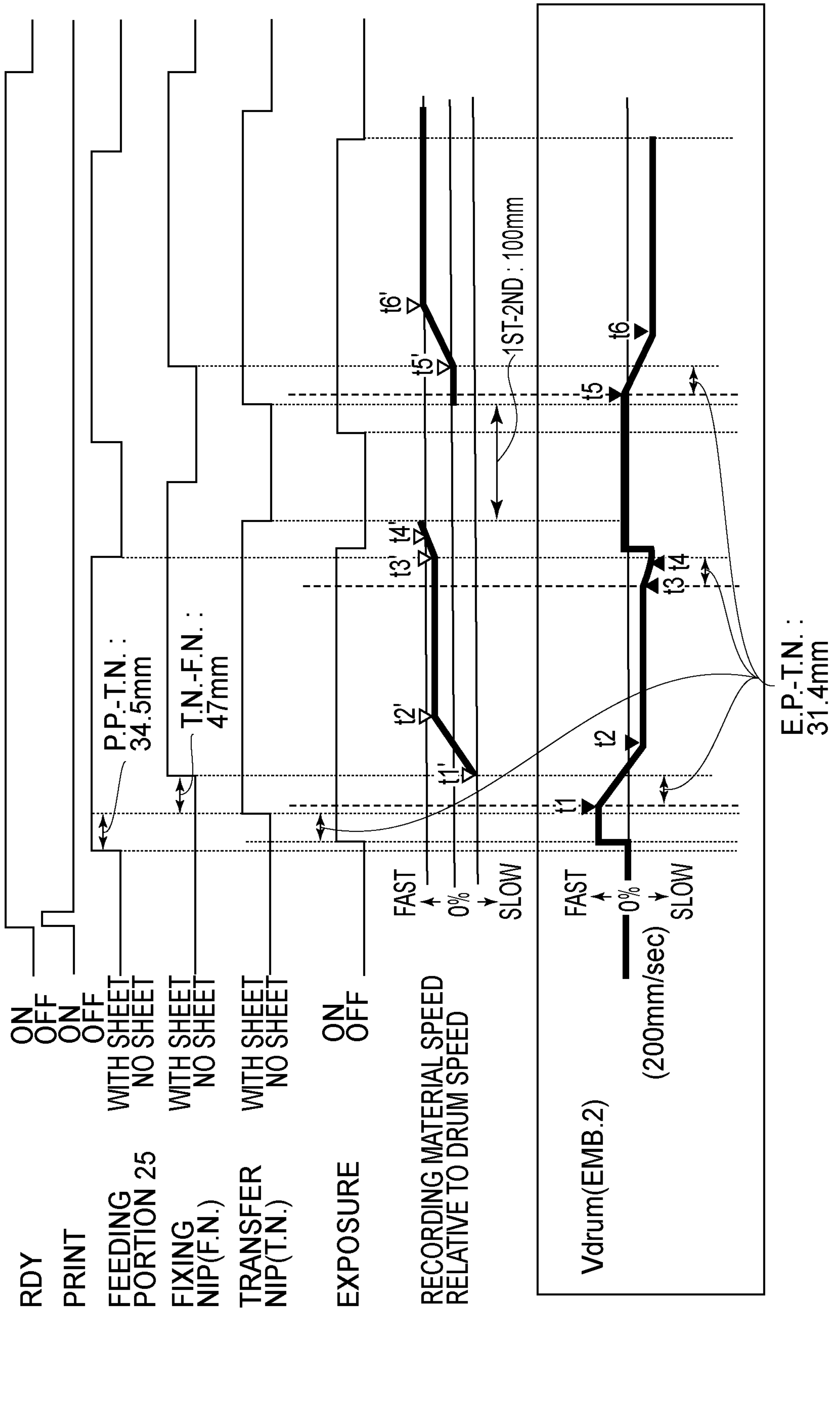
FIG. 8 is a timing chart showing change timing of a surface movement speed of a photosensitive drum in the image forming apparatus in Embodiment 2.

FIG. 8 shows a timing chart for illustrating a change in surface movement speed Vdrum of the photosensitive drum 1 in the image forming apparatus 50 in this embodiment. In FIG. 8, the case where a sheet ("Xerox Multi-purpose White Papers", LTR size, 75 g/m$^2$) is subjected to the double-side printing is shown.

The relative moving speed of the roller P to the surface movement speed of the photosensitive drum 1 is as shown in FIG. 8 and is different due to the difference in external force exerted on the recording material P between during first-side printing and during second-side printing. At the transfer nip Pb, the change in relative moving speed of the recording material P and the change in surface movement speed of the photosensitive drum 1 are the same as those in Embodiment 1. As regards during second-side printing, the relative moving speed of the recording material P is changed at timing t5' and timing t6' providing a steady-state speed. In this embodiment, the timing t6' was after 0.2 sec (corresponding to 40 mm in distance) from the timing t5'.

An interval (interval between the first side and the second side) from the passing of the recording material during first-side printing through the transfer nip Pb to the entrance of the recording material, which is turned upside down, into the transfer nip Pb again is 100 mm.

The timing when the surface movement speed of the photosensitive drum should be changed is timings t5 and t6 prior to the timings t5' and t6', respectively, when the relative moving speed of the roller is changed, by the time corresponding to the distance of 31.4 mm between the exposure position and the transfer nip on the photosensitive drum surface. Thus, between during first-side printing and during second-side printing, the timing of changing the surface movement speed of the photosensitive drum 1 is changed.

Further, as described above, during second-side printing, the recording material does not pass through the sheet feeding portion 25, and therefore is not subjected to the frictional resistance by the separation pad 26. For that reason, also the surface movement speed of the photosensitive drum 1 at exposure start timing is different between during first-side printing and during second-side printing.

During first-side printing, the moving speed of the recording material P at the transfer nip Pb was slower than the surface movement speed of the photosensitive drum 1 until the recording material P enters the pressing roller 23. However, during second-side printing, the surface movement speed of the photosensitive drum 1 and the moving speed of the recording material P coincide with each other until the recording material P enters the pressing roller 23. The image forming apparatus in this embodiment can meet the change in moving speed of the recording material P between during first-side printing and during second-side printing as described above.

Further, during first-side printing, even after the leading end of the recording material P enters the pressing roller 23, a force by the sheet feeding portion 25 acted on the recording material P for a while. However, during second-side printing, the force does not act on the recording material P.

Depending on the presence or absence of this external force, a slope of the change in relative speed between at the timing t1' and at the timing t2' and a slope of the change in relative speed between at the timing t5' and at the timing t6' are different from each other. That is, the change in relative moving speed of the recording material to the surface movement speed of the photosensitive drum is different between during first-side printing and during second-side printing.

Therefore, acceleration from the timing t1 to the timing t2 and acceleration from the timing t5 to the timing t6 are changed from each other.

As in this embodiment, even in the case where the double-side printing is carried out, when the surface movement speed of the photosensitive drum is properly changed depending on a magnitude of the external force at the timing prior to the timing when the external force actually changes, an effect similar to that in Embodiment 1.

Embodiment 3

Another embodiment of the image forming apparatus 50 will be described. The external force exerted on the recording material P in the apparatus main assembly 50*a* is not limited to the frictional resistance by the separation pad 26 of the sheet feeding portion 25 and the tensile force of the pressing roller 23. In the image forming apparatus 50 in Embodiment 1, after the leading end of the recording material P entered the fixing nip Pd, as the external force, the force was exerted on the recording material P in the direction of pulling the recording material P. For this reason, the apparatus in which the surface movement speed of the photosensitive drum 1 was gradually reduced was described. In this embodiment, an example in which the surface movement speed of the photosensitive drum 1 is increased will be described.

Figure 9:
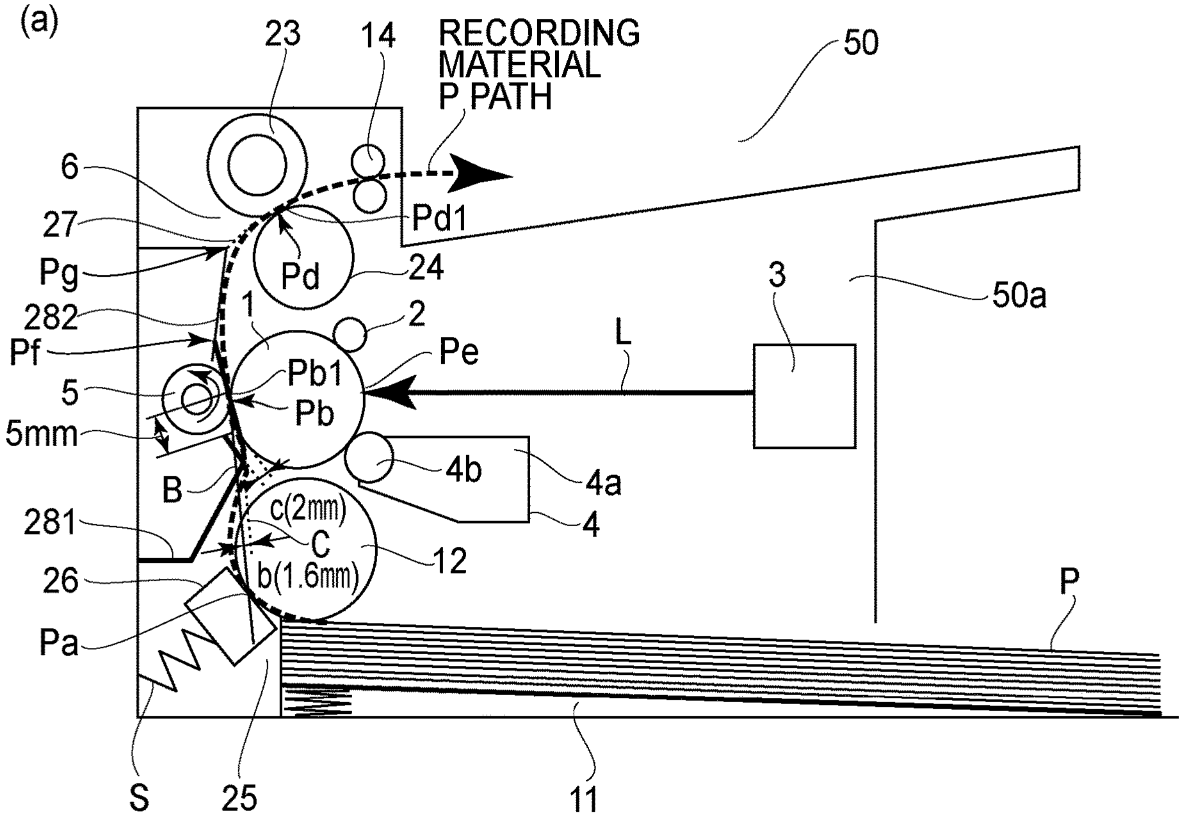
In FIG. 9, (a) and (b) are schematic views for illustrating a structure of an image forming apparatus in Embodiment 3.
Figure 9:
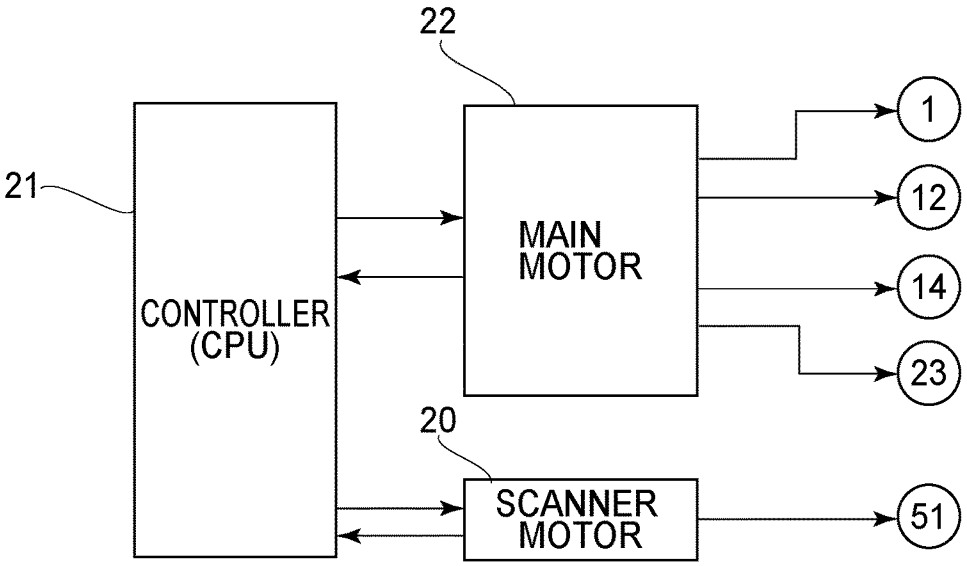

An image forming apparatus shown in (a) of FIG. 9 has a constitution in which an entrance guide 281 toward the transfer nip Pb entered the photosensitive drum 1 side. By this constitution, it is possible to suppress disturbance of the toner image transferred on the recording material P. In the case of this constitution, friction between the recording material P and the entrance guide 281 becomes large. That is, the entrance guide 281 for assisting entrance of the recording material P into the transfer nip Pb exerts a sliding resistance on the recording material P during contact of the recording material P with the entrance guide 281.

This apparatus further includes a frame 282 for regulating the recording material feeding direction so that the recording material P after being separated from the surface of the photosensitive drum 1 is fed toward the fixing portion 6. Also this frame 282 exerts the sliding resistance on the recording material P.

These sliding resistances constitute back tension, so that the moving speed Vpaper of the recording material P at the transfer nip Pb lowers.

A structure of the image forming apparatus 50 will be described with reference to FIG. 9. In FIG. 9, (a) is a sectional view showing a schematic structure of the image forming apparatus 50 in this embodiment, and (b) is a block diagram showing a driving system of a main motor 22 and a scanner movement 20.

Also in this embodiment, members which are the same as those in Embodiment 1 are represented by the same reference numerals or symbols and will be omitted from description.

Figure 3:
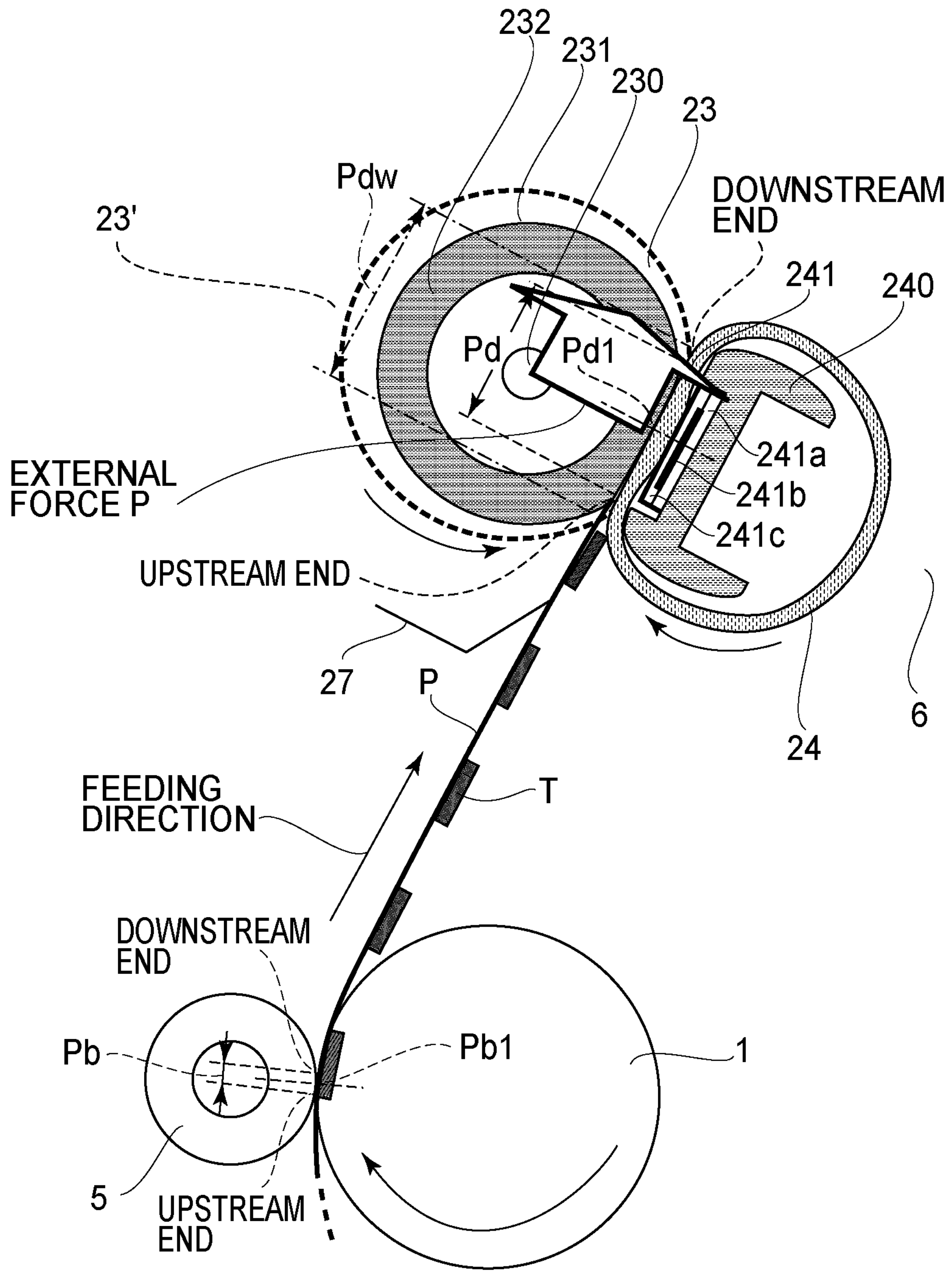
FIG. 3 is a sectional view showing a relationship between a photosensitive drum and a transfer roller and a structure of a fixing portion.

The entrance guide 281 largely enters the photosensitive drum 1 side with respect to a rectilinear line B connecting the press-contact portion Pa of the sheet feeding portion 25 and an upstream end of the transfer nip Pb (FIG. 3).

An entering amount b of this entrance guide 281 more improves toner image disturbance with a larger value thereof. However, when the entering amount is excessively large, a gap c between the entrance guide 281 and the photosensitive drum 1 surface narrows, so that the recording material P is not readily fed into the transfer nip Pb. In this embodiment, the entering amount was 1.6 mm, and the gap C was 2 mm.

Further, the entrance guide 281 is provided so that a length on a rectilinear line C connecting a top of the entrance guide 281 in the photosensitive drum 1 surface side and the center Pb1 of the transfer nip Pb is 5 mm.

Between the transfer nip Pb and the entrance guide 281, the frame 282 is provided since there is a need to regulate a recording material feeding path so that the recording material P is fed toward the fixing portion 6. The recording material P passed through the transfer nip Pb moves straight along the rectilinear line C and abuts against at an intersection point Pf between the rectilinear line C and the frame 282 and thereafter moves toward the fixing portion 6 while sliding on the frame 282.

With respect to the feeding direction of the recording material P, a distance from the center Pb1 of the transfer nip Pb to the intersection point Pf is 10 mm. Further, the sum of a distance from the intersection point Pf and a top Pg of the entrance guide 27 and a distance from the top Pg to the center Pd1 of the fixing nip Pd is 40 mm in total.

Figure 10:
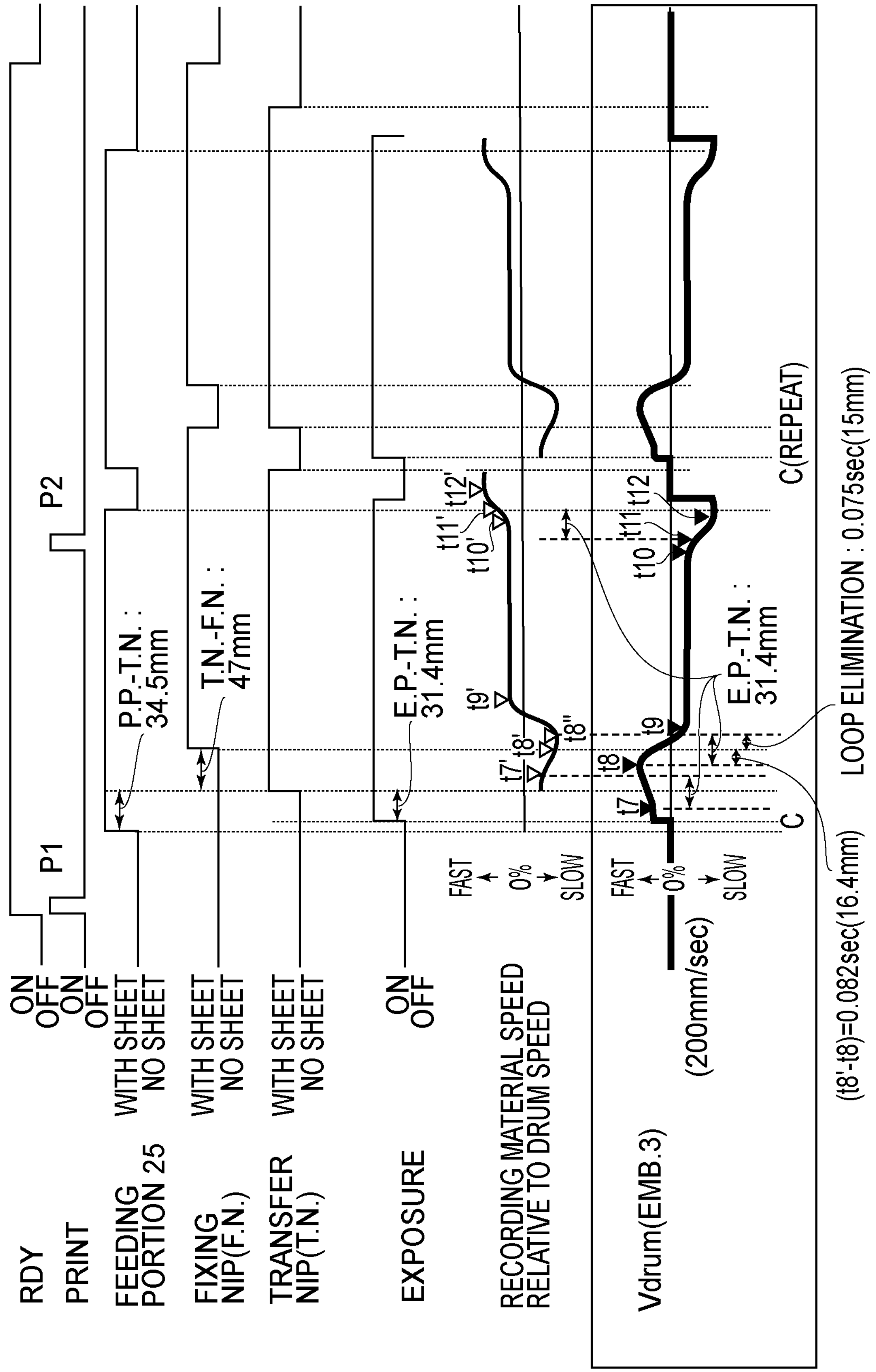
FIG. 10 is a timing chart showing change timing of a surface movement speed of a photosensitive drum in the image forming apparatus in Embodiment 3.

FIG. 10 shows a timing chart for illustrating a change in surface movement speed Vdrum of the photosensitive drum 1 in the image forming apparatus 50 in this embodiment. In FIG. 10, the case where two sheets ("Xerox Multi-purpose White Papers", LTR size, 75 g/m$^2$) are subjected to the continuous printing is shown.

The relative moving speed of the recording material P to the surface movement speed Vdrum of the photosensitive drum 1 is subjected to the frictional resistances by the separation pad 26 and the entrance guide 281, and therefore is slower than the surface movement speed of the photosensitive drum 1. For that reason, the recording material P enters the fixing nip Pd at a speed slower than the surface movement speed of the photosensitive drum 1.

Thereafter, the recording material P moves toward the intersection Pf, on the frame 282, which is in a linear distance of 9.5 mm from a downstream end (FIG. 3) of the transfer nip Pb with respect to the recording material feeding direction, and starts to receive the frictional resistance of the frame 282 from timing t7' when the recording material leading end abuts against the intersection Pf on the frame 282. For that reason, after the timing t7', the moving speed of the recording material P starts to gradually reduce.

A distance from the transfer nip Pb to the fixing nip Pd is 47 mm. This distance is the sum of distances of a rectilinear line connecting the downstream end of the transfer nip Pb with respect to the recording material feeding direction and the intersection point Pf, a rectilinear line connecting the intersection point Pf and the top Pg of the entrance guide 27, and a rectilinear line connecting the top Pg and the upstream end (FIG. 3) of the fixing nip Pd with respect to the roller feeding direction. The distance between the transfer nip Pb and the fixing nip Pd is 47 mm which is short, and therefore, before the moving speed of the recording material P starts to reduce at the timing t7' and is in the steady state, the leading end of the recording material P enters the fixing nip Pd (timing t8') and is fed by the pressing roller 23.

After the recording material P is fed by the pressing roller 23 of which surface movement speed is faster than the surface movement speed of the photosensitive drum 1, the recording material P curved along the frame 282 is spaced from the frame 282 while a degree of the curve is gradually eliminated. The relative moving speed of the recording material P is accelerated, after the curve is eliminated, by the tensile force by the feeding force of the pressing roller 23. In this embodiment, timing t8" when the curve is eliminated was timing after 0.075 sec (corresponding to 15 mm in distance) from the timing t8' when the leading end of the recording material P actually entered the pressing roller 23.

After the timing t8", timing t9' when the recording material P is fed in a steady state in which the surface movement speed of the pressing roller 23 is dominant was timing after 0.2 sec (corresponding to 40 mm in distance).

Thereafter, the relative moving speed of the roller P is gradually accelerated at timing t10' when the sliding resistance of the entrance guide 281 is eliminated and at timing t11' when the frictional resistance of the separation pad 26 is eliminated, and was in the steady state at timing t12'.

Thus, the relative moving speed of the recording material P changes depending on the change in external force exerted on the recording material P at the timings t7' to t12'. In this embodiment, the surface movement speed of the photosensitive drum 1 is changed in advance of the change in relative moving speed of the recording material P.

Therefore, the surface movement speed of the photosensitive drum 1 is changed in advance at timing prior to the timing, when the relative moving speed of the recording material P changes, by the time corresponding to the distance of 31.4 mm between the exposure position and the transfer nip on the surface of the photosensitive drum 1. Here, the timings when the relative moving speed of the recording material P changes are t7', t8", t9', t10', t11' and t12', and the timings prior to these timings by the time corresponding to the distance of 31.4 mm between the exposure position and the transfer nip on the photosensitive drum surface are t7, t8, t9, t10, t11 and t12.

The timing when the external force exerted on the recording material P actually changes is the timing t8', but the timing when the curve is eliminated and the relative moving speed of the recording material P changes is the timing t8", and therefore, the timing t8 may preferably be prior to the timing t8" by the time corresponding to the distance of 31.4 mm. The timing t8 is timing prior to the timing t8' by (t8'-t8)=0.082 sec (corresponding to 16.4 mm in distance).

Thus, when the surface movement speed of the photosensitive drum is properly changed depending on a magnitude of the external force at the timing prior to the timing, when the external force exerted on the recording material P actually changes, by the time corresponding to the distance of 31.4 mm, an effect similar to that in Embodiment 1.

Embodiment 4

Another embodiment of the image forming apparatus 50 will be described. The image forming apparatus 50 in this embodiment uses an apparatus (device) of an LED print heat type as the exposure portion 3.

The exposure portion 3 is not limited to the exposure portion of a laser scanner type. As disclosed in JP-A 2012-101497, the device of the LED print head type in which an LED (light-emitting diode) light source may be used as the exposure portion 3. In this case, it is also possible to obtain an effect similar to that in Embodiment 1 by changing light-emitting timing of the LED light source for the photosensitive drum 1 rotating at a certain speed. The exposure portion 3 of the LED print head type is capable of omitting mechanisms such as the scanner motor for rotating the polygon mirror and the polygon mirror for scanning the photosensitive drum surface with the laser light when compared with the laser scanner type, and therefore, the image forming apparatus 5 can be downsized.

A feature of the image forming apparatus 50 in this embodiment is that the surface movement speed of the photosensitive drum 1 is a certain speed and a light-emitting interval of the exposure portion 3 of the LED print head type is changed at timing prior to conventional timing. The timing of changing the light-emitting interval in the exposure portion 3 is required to be timing prior to the timing, when the external force exerted on the recording material P changes, by the time corresponding to the distance (=31.4 mm) from the exposure position Pe to the center Pb1 of the transfer nip Pb on the surface of the photosensitive drum 1.

Figure 11A:
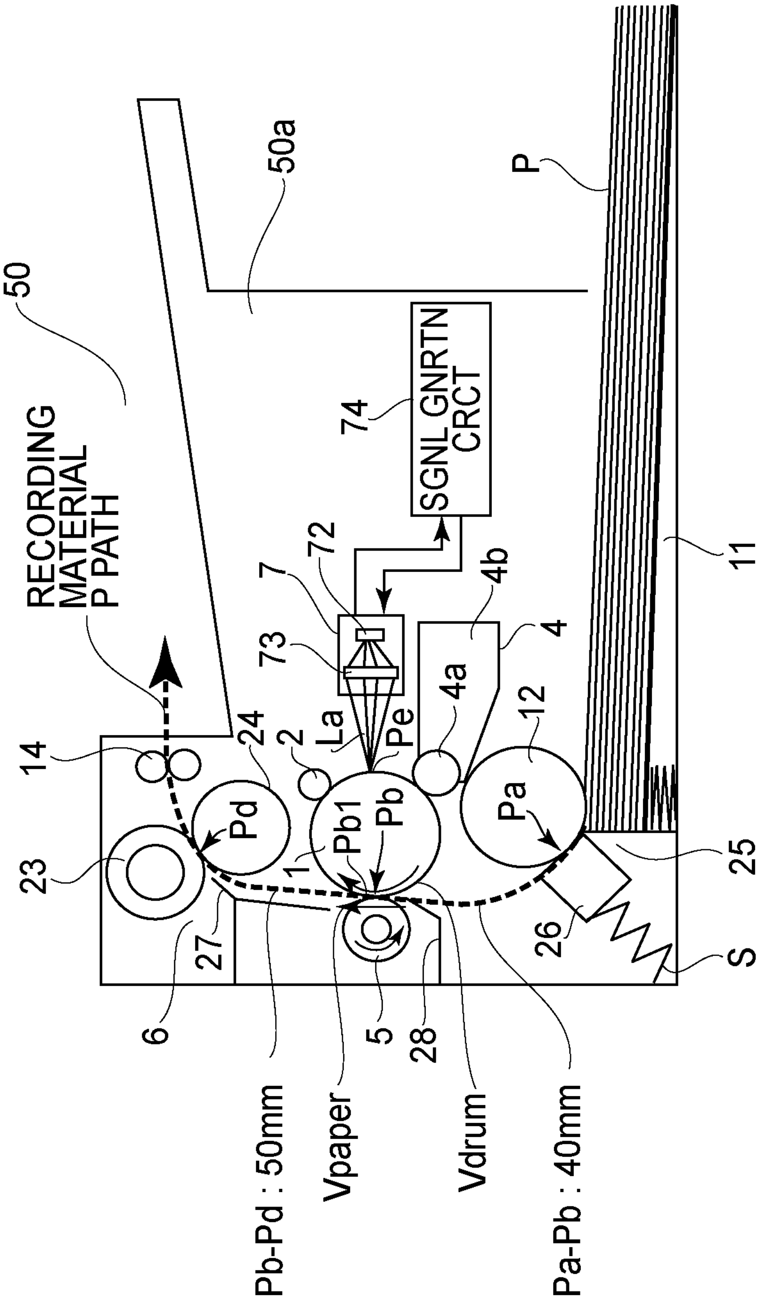
FIGS. 11A to 11C are schematic views for illustrating a structure of an image forming apparatus in Embodiment 4.
Figure 11B:
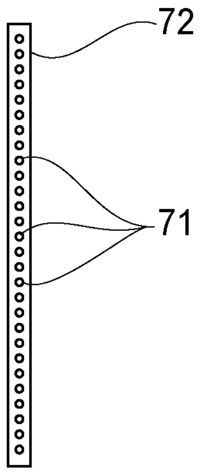
Figure 11C:
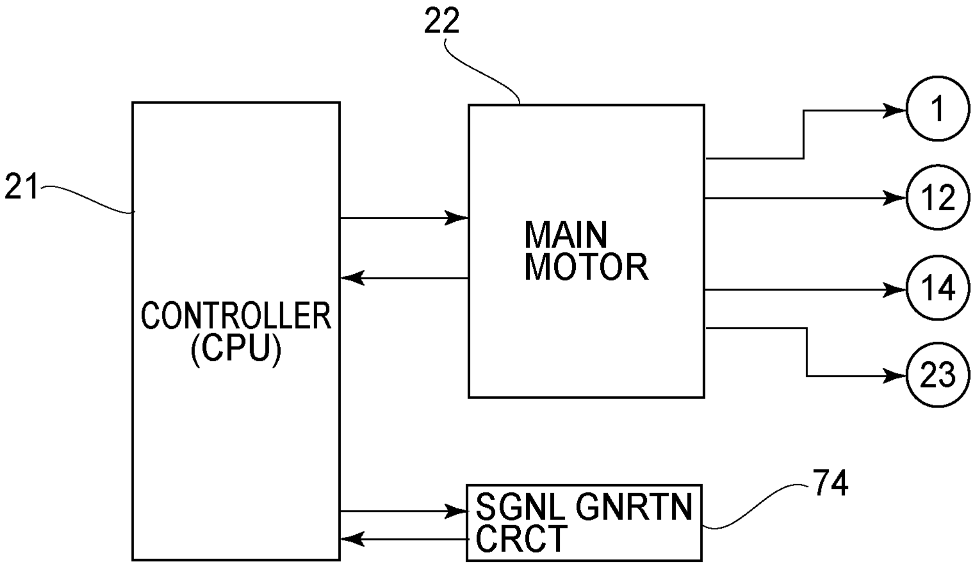

A structure of the image forming apparatus 50 will be described with reference to FIG. 11. FIG. 11A is a sectional view showing a schematic structure of the image forming apparatus 50 in this embodiment. FIG. 11B is a front view showing a light-emitting source 72 of the exposure portion 3. FIG. 11C is a block diagram showing a driving system of a main motor 22 and a signal generating circuit 74.

Also in this embodiment, members which are the same as those in Embodiment 1 are represented by the same reference numerals or symbols and will be omitted from description.

The exposure portion 3 includes the light-emitting source 72 provided with a light-emitting element (LED) 71 and a print head 73 provided with a plurality of lenses (optical means) for focusing light la, emitted from the light-emitting source 72, on the surface of the photosensitive drum 1. The exposure portion 3 is controlled by the signal generating circuit 74. The signal generating circuit 74 carried out processes such as sorting of image data and correction of a light quantity on the basis of objective image information inputted from an unshown external device such as an image scanner or a computer. A resolution is controlled so as to be 1200 dpi with respect to each of a main scan direction and a sub-scan direction. The signal generating circuit 74 is controlled by the control device 21.

As in the image forming apparatus 50 in this embodiment, in the case where the exposure portion 3 is of the LED print head type, by changing the light-emitting interval of the light-emitting source 72 by the signal generating circuit 74, it is possible to change a latent image interval on the surface of the photosensitive drum 1 with respect to the sub-scan direction. For example, when the light-emitting interval is increased in a state in which the surface movement speed Vdrum of the photosensitive drum 1 is constant, the latent image formed on the photosensitive drum surface with respect to the sub-scan direction is in a state in which the latent image is expanded more than that in a normal state.

When horizontal lines and drawn on the recording material P with intervals of 10 mm with respect to the feeding direction of the roller P, the case where the external force exerted on the recording material P is a force exerted in a direction of preventing the feeding of the recording material will be described as an example.

In the case where the moving speed Vpaper of the recording material at the transfer nip Pb is 2% slower than a normal speed (process speed: 200 mm/sec), during movement of the surface of the photosensitive drum 1 by 10 m, the recording material P moves only by 9.8 mm. For that reason, the toner image transferred on the recording material is 9.8 m in interval, so that the toner image is contracted more than a normal image Against this phenomenon, the surface movement speed Vdrum (=process speed: 200 mm/sec), of the photosensitive drum 1, which is a certain speed, the light-emitting interval of the light-emitting source 72 is increased by 2%. Then, an interval of the latent image, with respect to the sub-scan direction, formed on the surface of the photosensitive drum 1 is 10.2 mm although the latent image interval was 10 mm in the case of a normal light-emitting interval. This latent image on the surface of the photosensitive drum 1 is developed into the toner image by the developing portion 4, so that the toner image on the surface of the photosensitive drum 1 is in a state in which the image interval of the toner image is expanded to 10.2 mm.

The moving speed Vpaper of the recording material P is slower than the surface movement speed Vdrum of the photosensitive drum 1 by 2%, and therefore the first interval (first size) of the toner image on the surface of the photosensitive drum 1 is expanded to 10.2 mm in advance. As a result, the recording material P moves in a length of about 10 mm during movement of the photosensitive drum surface at the transfer nip Pb by 10.2 mm. Accordingly, on the recording material P, it is possible to draw the horizontal lines with objective intervals of 10 mm. The timing when the light-emitting interval of the light-emitting source 72 is changed is timing prior to the timing, when the external force exerted on the recording material P changes, by the time corresponding to the distance of 31.4 mm between the exposure position Pe and the transfer nip Pb.

Thus, when the light-emitting interval of the light-emitting source 72 at the exposure portion 3 is changed, depending on the change in external force exerted on the recording material P, in a state in which the surface movement speed Vdrum of the photosensitive drum 1 is made constant, it is possible to obtain an effect similar to that in Embodiment 1.

Embodiment 5

Another embodiment of the image forming apparatus will be described. The image forming apparatus 50 is not limited to the monochromatic printer in Embodiments 1 to 4, but may also be an image forming apparatus using an intermediary transfer belt (image carrying member) as disclosed in JP-A 2008-309906.

Figure 12:
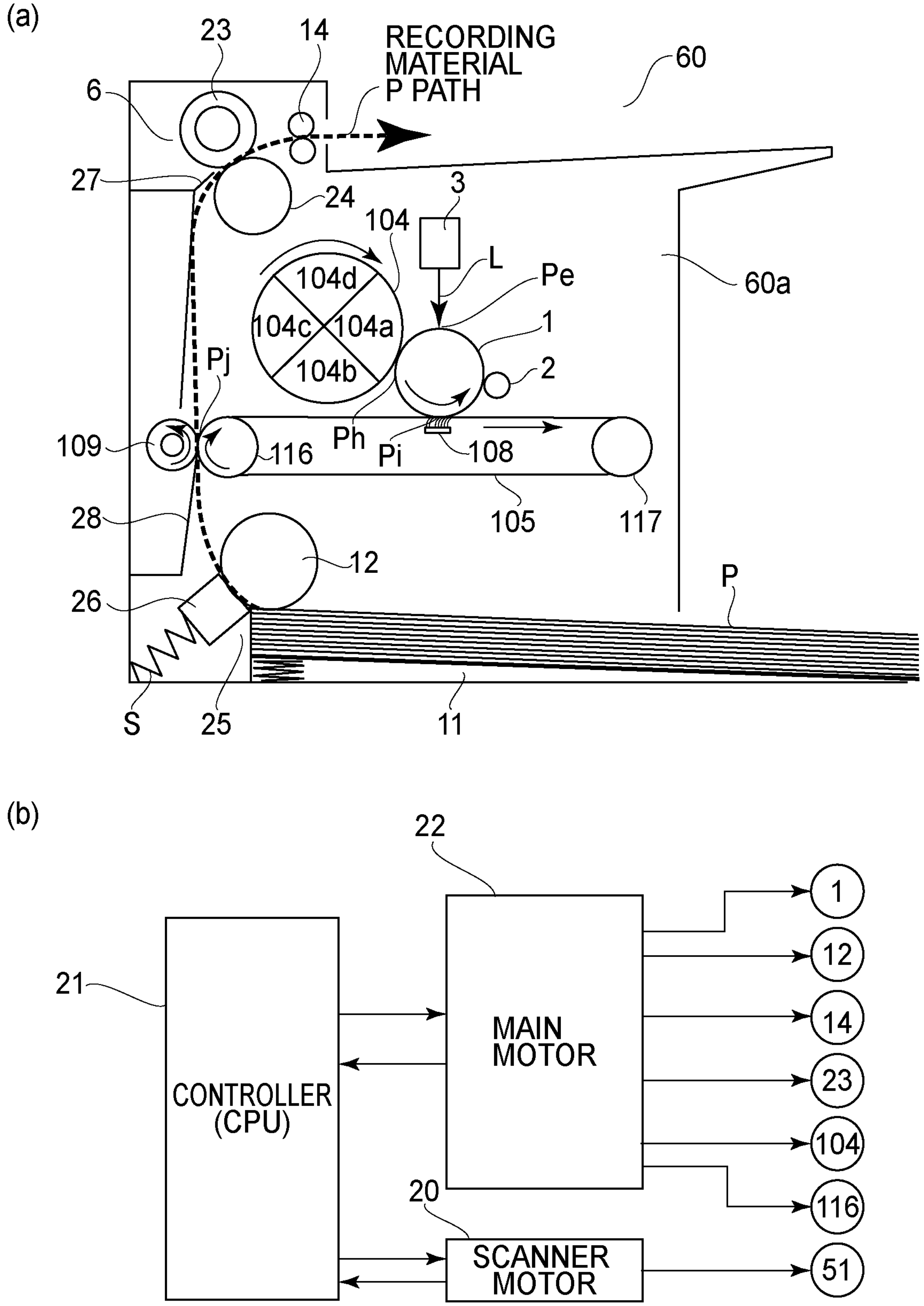
In FIG. 12, (a) and (b) are schematic views for illustrating a structure of an image forming apparatus in Embodiment 5.
Figure 13:
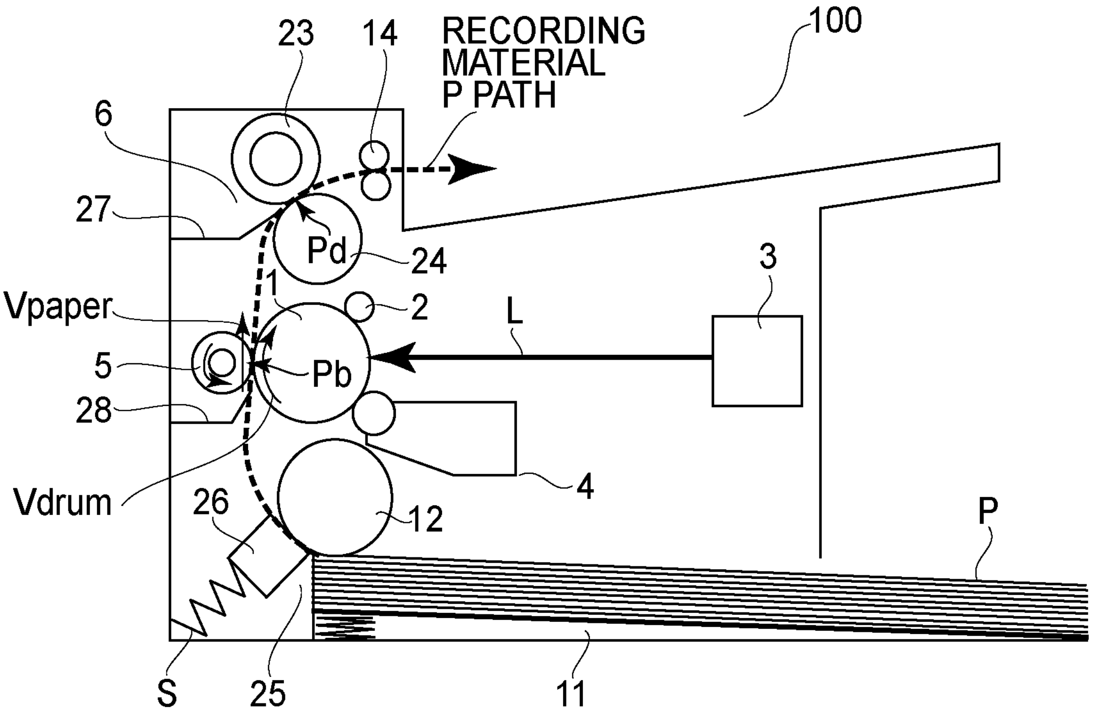
FIG. 13 is a schematic view for illustrating a structure of a conventional image forming apparatus.
Figure 14:
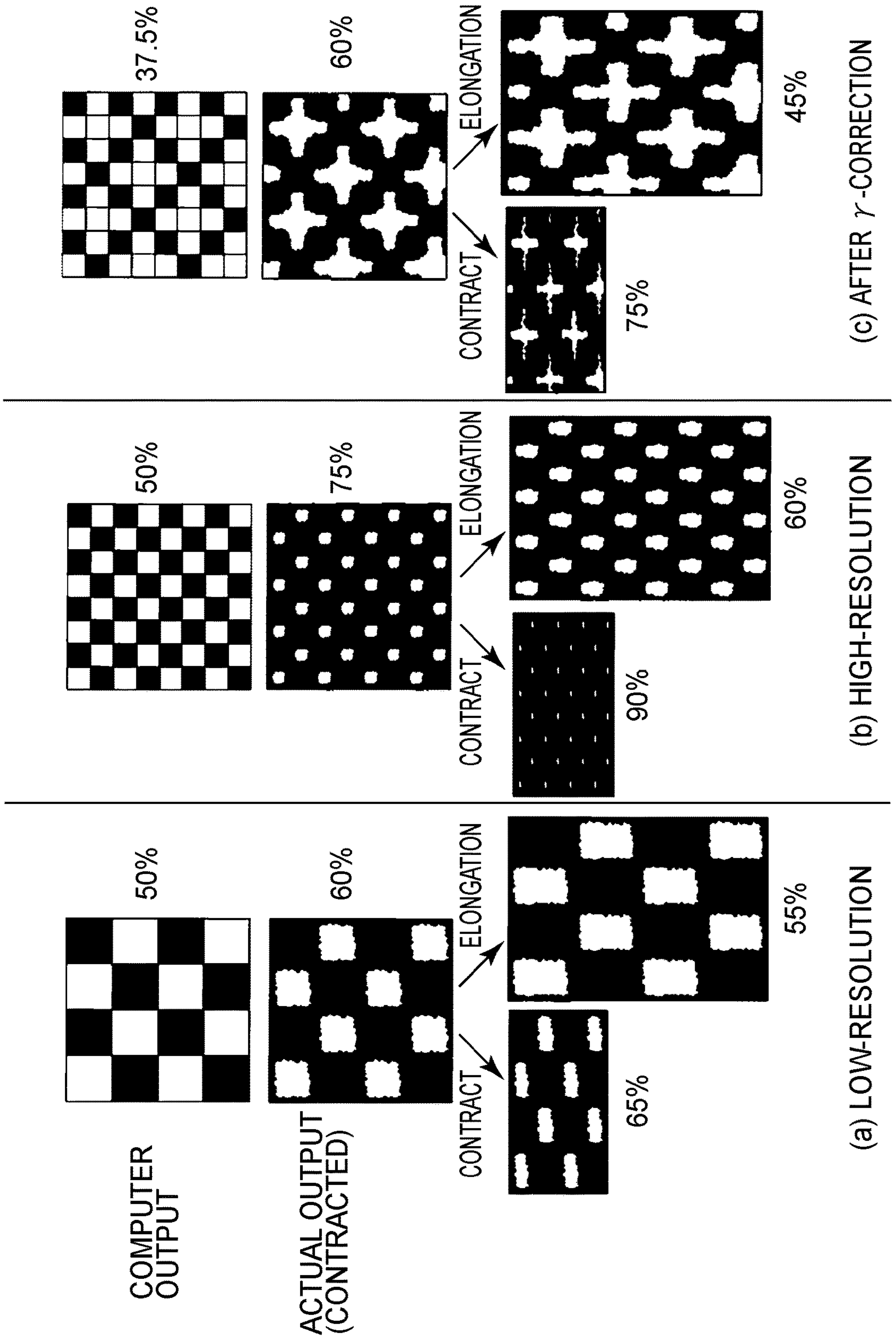
In FIG. 14, (a) to (c) are schematic views showing an influence of image expansion and contraction on density non-uniformity depending on a resolution.
Figure 15:
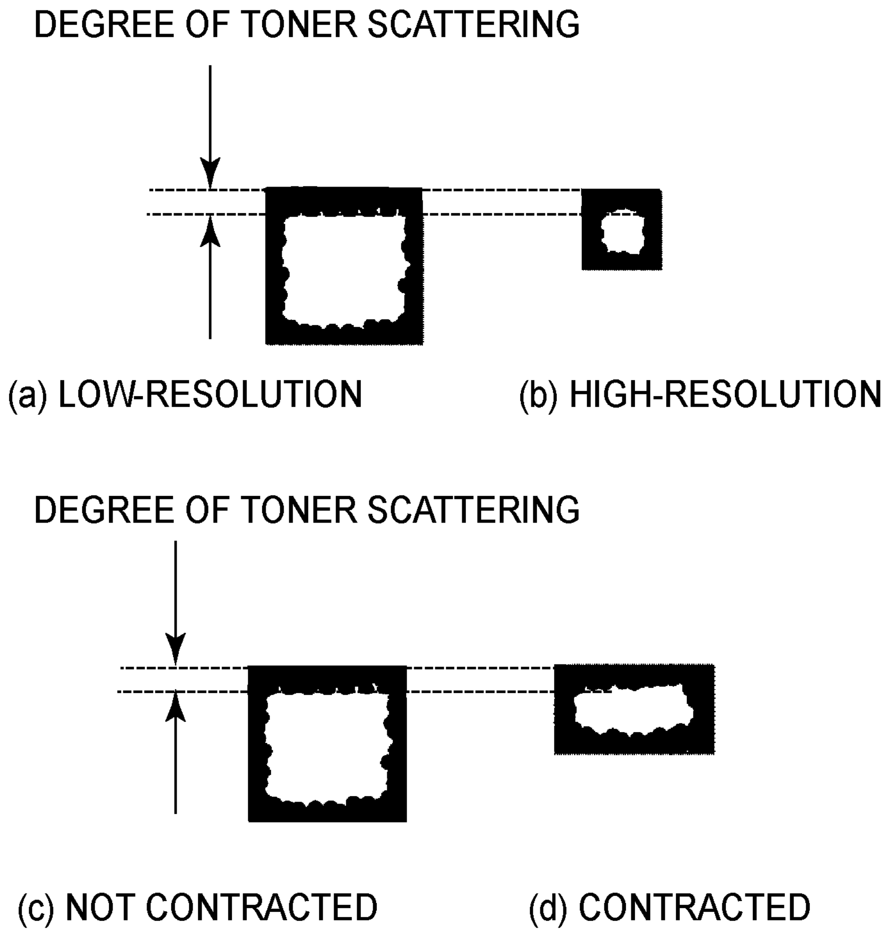
In FIG. 15, (a) to (d) are schematic views for illustrating the density non-uniformity at a low resolution, a high resolution and when an image is expanded and contracted.

A structure of an image forming apparatus 60 will be described with reference to FIG. 12. In FIG. 12, (a) is a sectional view showing a schematic structure of an example of the image forming apparatus 60 (a full-color printer in this embodiment) using electrophotography, and (b) is a block diagram showing a driving system of a main motor 22 and a scanner movement 20.

Also in this embodiment, members which are the same as those in Embodiment 1 are represented by the same reference numerals or symbols and will be omitted from description.

The image forming apparatus 60 in this embodiment forms a full-color toner image by primary-transferring, onto an outer peripheral surface of an intermediary transfer belt (intermediary transfer portion) 105, toner images of respective colors of yellow, magenta, cyan and black formed in accordance with image information subjected to color-separation into the respective color components. Then, the full-color toner image is secondary-transferred onto the recording material P. The process speed is 100 mm/sec, and letter-sized papers (sheets) are used as a maximum-sized recording material used in the image forming apparatus and are outputted at a rate of 4 sheets per (one) minute.

In the image forming apparatus 60, an outer diameter of the photosensitive drum 1 is 20 mm. At a normal driving speed of the main motor 22, the surface movement speed of the photosensitive drum 1 is a process speed of 100 mm/sec.

The exposure portion 3 is of the laser scanner type described in Embodiment 1. At the exposure portion 3, the number of turns of the scanner motor 20 and output timing of the laser light L are controlled by the control device 21 so that a predetermined resolution can be obtained. In this embodiment, both of resolutions with respect to the main scan direction and the sub-scan direction (circumferential direction of the photosensitive drum 1) are controlled so as to be 1200 dpi.

A developing portion 104 is of a rotary type and include a cartridge accommodating portion provided rotatably in an apparatus main assembly **60*a*. To the cartridge accommodating portion, each of developing cartridges 104*a*, 104*b*, 104*c* and 104*d* for yellow, magenta, cyan and black, respectively, is detachably mountable. The cartridge accommodating portion is rotated in an arrow direction by the main motor 22. By this rotation of the cartridge accommodating portion, the respective developing cartridges 104*a*-104*d* are successively switched and fed to a developing position Ph for developing a latent image, formed on the surface of the photosensitive drum 1**, into the toner image.

In a side downstream of the developing position Ph with respect to the rotational direction of the photosensitive drum 1, an endless intermediary transfer belt (intermediary transfer portion) 105 onto which the toner image formed on the photosensitive drum surface is to be transferred is provided. The intermediary transfer belt 105 is an endless belt-like film stretched between a driving roller 116 for rotating the intermediary transfer belt 105 and a tension roller 117 for imparting tension to the intermediary transfer belt 105. The intermediary transfer belt 105 is moved (rotated) in an arrow direction at a surface movement speed which is the same as the surface movement speed of the photosensitive drum 1 by driving the driving roller 116 by the main motor 22.

In this embodiment, as the intermediary transfer belt 105, the endless belt-like film which was formed of a resin material, i.e., PVDF (polyvinylidene fluoride) having a good parting property and durability and which was 100 μm in thickness and $10^{10}$ Ωm in volume resistivity was used. Further, as the driving roller, a roller, having a diameter of 25 mm, which was $10^4 \Omega$ in resistance and which was prepared by coating an aluminium-made core metal with a 0.5 mm-thick layer of EPDM (ethylene-propylene-diene rubber) in which carbon black was dispersed as an electroconductive agent. As the tension roller 117, an aluminum-made metal bar of 25 mm in diameter was used.

The tension roller 117 imparts tension to the intermediary transfer belt 105 by being urged in a direction of being spaced from the driving roller 116 at end portions thereof with respect to the longitudinal direction perpendicular to the feeding direction of the recording material P. In this embodiment, the tension imparted to the intermediary transfer belt 105 was 39.2 N (4 kgf).

At a position opposing the photosensitive drum 1 via the intermediary transfer belt 105, a transfer brush (first transfer portion) 108 is provided, so that a primary transfer nip (first transfer position) Pi is formed by the surface of the photosensitive drum 1 and the outer peripheral surface of the intermediary transfer belt 105. Further, with rotation of the photosensitive drum 1 and the intermediary transfer belt 105, a primary transfer voltage (primary transfer bias) is applied from an unshown transfer bias voltage source to the transfer brush 108. As a result, at the primary transfer nip Pi, the toner image is primary-transferred from the surface of the photosensitive drum 1 onto the surface of the intermediary transfer belt 105.

The above-described transfer step is carried out for the developing cartridges **104*a* (yellow), 104*b* (magenta), 104*c* (cyan) and 104*d* (black), so that the toner images of the plurality of colors are formed superposedly on the surface of the intermediary transfer belt 105**. For example, in the case of the full-color image, the toner images of the four colors of yellow, magenta, cyan and black are formed superposedly.

At a position opposing the driving roller 116 via the intermediary transfer belt 105, a secondary transfer roller (second transfer portion) 109 is provided, so that a secondary transfer nip (second transfer position) Pj is formed by the surface of the intermediary transfer belt 105 and an outer peripheral surface of the secondary transfer roller 109. To the secondary transfer nip Pj, the recording material P is fed into the apparatus at predetermined timing by the roller 12 of the sheet feeding portion 25.

The recording material P is introduced into the secondary transfer nip Pj by the entrance guide 28. Simultaneously with the introduction of the recording material P into the secondary transfer nip Pj, to the secondary transfer roller 109, a secondary transfer voltage (secondary transfer bias) is applied from an unshown secondary transfer bias voltage source. As a result, the toner image is secondary-transferred from the surface of the intermediary transfer belt 105 onto the recording material P at the secondary transfer nip Pj.

In this embodiment, as the secondary transfer roller 109, a roller which is 18 mm in diameter and which is prepared by coating a nickel-plated steel bar of 6 mm in diameter with a foam sponge of NBR adjusted to $5\times10^7$ Ω in resistance was used. An outer diameter of the foam sponge is 13 mm. A width of the foam sponge with respect to the longitudinal direction perpendicular to the feeding direction of the roller P is 216 mm on the assumption of a letter size as a maximum-sized recording material usable in the apparatus. Further, the secondary transfer roller 109 is contacted to the intermediary transfer belt 105 with contact pressure of 58.8 N (6 kgf), and is rotated by the rotation of the intermediary transfer belt 105.

The recording material P on which the toner image is transferred at the secondary transfer nip Pj is separated from the surface of the intermediary transfer belt 105 and is fed toward the fixing portion 6. The recording material carrying thereon the unfixed toner image is introduced into the fixing nip Pd by the entrance guide 27. The entrance guide 27 is a guide for assisting entrance of the recording material P into the fixing nip Pd. The recording material P is nipped and fed at the fixing nip Pd, whereby the toner image is heat-fixed on the recording material P.

The recording material P passed through the fixing portion 6 is discharged to an outside of the apparatus by the roller 14.

In the image forming apparatus 60 in this embodiment, the number of the motors is two, i.e., the main motor 22 and the scanner motor 20. Also in this embodiment, the exposure interval of the polygon mirror 51 of the exposure portion 3 with respect to the sub-scan direction is constant. On the other hand, the driving speed of the main motor 22 can be changed by the control device (CPU) 21.

A rotational driving force of the main motor 22 is transmitted to each of the photosensitive drum 1, the roller 12 of the sheet feeding portion 25, the cartridge accommodating portion of the developing portion 104, the driving roller 116 for the intermediary transfer belt 105, the pressing roller 23 of the fixing portion 6 and the roller 14 via an unshown power transmitting mechanism. That is, the driving speed of the main motor 22 is reduced in order to reduce the surface movement speed Vdrum of the photosensitive drum 1. Then, the speeds of the roller 12 of the sheet feeding portion 25, the cartridge accommodating portion of the developing portion 104, the driving roller 116 for the intermediary transfer belt 105, the pressing roller 23 and the roller 14 are reduced with the same ratio as that of the main motor 22.

For example, when the surface movement speed of the photosensitive drum 1 is reduced by 1%, each of the photosensitive drum 1, the roller 12 of the sheet feeding portion 25, the cartridge accommodating portion of the developing portion 104, the driving roller 116 for the intermediary transfer belt 105, the pressing roller 23 and the roller 14 operates at the speed of 99 m/sec. The secondary transfer roller 109 is rotated by the intermediary transfer belt 105 in order to suppress the change in feeding speed of the recording material P at the secondary transfer nip Pj due to an outer peripheral length of the secondary transfer roller 109.

Also in the image forming apparatus 60 in this embodiment, the moving speed Vpaper of the recording material P at the secondary transfer nip Pj is changed by the external force exerted on the recording material P in some instances similarly as in Embodiment 1. In this case, a deviation generates between timing when the toner image transferred on the surface of the intermediary transfer belt 105 reaches the secondary transfer nip Pj and timing when an image position on the recording material P on which the toner image to be transferred, so that the expansion and contraction of the image generates.

In order to prevent the generation of the image expansion and contraction, there is a need that the moving speed Vpaper of the recording material P, at the secondary transfer nip Pj, changing depending on the external force exerted on the recording material P and the moving speed of the surface of the intermediary transfer belt 105 coincide with each other.

For that reason, in the exposure steps for the respective colors, the surface movement speed Vdrum of the photosensitive drum 1 may only be required to be changed with respect to a certain exposure interval of the polygon mirror 51 of the exposure portion 3 with respect to the sub-scan direction. A latent image interval of the photosensitive drum surface with respect to the sub-scan direction changes with the change in surface movement speed of the photosensitive drum 1, whereby it is possible to change magnification of the toner image transferred onto the surface of the intermediary transfer belt 105. As a result, it becomes possible to change a size of the toner image reaching the secondary transfer nip Pj.

That is, the magnification of the toner image, with respect to the sub-scan direction, formed on the photosensitive drum 1 is changed by changing the rotational speed of the main motor 22. With this change, the magnification of the toner image transferred onto the intermediary transfer belt 105 is changed.

The timing of changing the surface movement speed Vdrum of the photosensitive drum 1 is timing prior to timing of the change in moving speed Vpaper of the recording material P at the secondary transfer nip Pj. That is, the surface movement speed of the intermediary transfer belt is changed from timing prior to the timing when the external force exerted on the recording material changes and the recording material moving speed at the secondary transfer nip starts to change.

Here, the timing prior to the recording material moving speed change timing is timing prior to the timing, when the external force exerted on the recording material P changes, by the time corresponding to the following distance. This distance is the sum of a rotational movement distance in which the photosensitive drum surface rotates from the exposure portion position Pe to the primary transfer nip Pi and a rotational movement distance in which the surface of the intermediary transfer belt 105 rotates from the primary transfer nip Pi to the secondary transfer nip Pj.

Thus, in advance of the timing when the recording material moving speed at the secondary transfer nip fluctuates due to the external force, when the magnification of the toner image formed on the intermediary transfer belt, it is possible to obtain an effect similar to that in Embodiment 1.

The image forming apparatus 60 in this embodiment may also have a constitution in which only the driving roller 116 is driven by a motor (unshown) other than the main motor 22. In this case, the surface movement speed Vdrum of the photosensitive drum 1 is made constant, and in that state, by controlling the drive of the motor (other than the main motor 22) by the control device 21, the moving (rotating) speed of the intermediary transfer belt 105 is changed. The exposure interval of the polygon mirror 51 of the exposure portion 3 with respect to the sub-scan direction is constant, and also the magnification of the toner image on the surface of the photosensitive drum 1 with respect to the sub-scan direction is constant.

For that reason, for example, in the case where the moving speed of the intermediary transfer belt 105 is made slow, the surface movement speed of the intermediary transfer belt 105 at the primary transfer nip Pi is slower than the moving speed of the surface of the photosensitive drum 1. As a result, the image interval of the toner image transferred onto the intermediary transfer belt 105 can be contracted (i.e., the image magnification can be reduced).

Every time when the toner image for one color formed on the surface of the photosensitive drum 1 is transferred from the photosensitive drum surface onto the surface of the intermediary transfer belt 105, it is only required that the moving speed of the intermediary transfer belt 105 is changed in advance and the toner image on the intermediary transfer belt surface may be expanded and contracted.

Thus, depending on the change in external force exerted on the recording material P, at proper timing prior to the timing when the external force exerted on the recording material P changes, a relative speed between the surface movement speed of the intermediary transfer belt and the surface movement speed of the photosensitive drum at the primary transfer nip is changed. As a result, the image expansion and contraction generating due to the change in external force exerted on the recording material P can be suppressed, so that it becomes possible to output an image free from density non-uniformity.

Other Embodiments

In the above-described image forming apparatus 50, the pressing roller 23 of the fixing portion 6 may also be driven by another motor (unshown) other than the main motor 22. In this case, another motor and the main motor 22 are driven by the control device 20 so that the feeding speed of the recording material P by the pressing roller 23 and the feeding speed of the recording material P by the photosensitive drum 1 are substantially constant. In that case, even when the pressing roller 23 is thermally expanded, the tensile force is not exerted on the recording material P.

For that reason, even when the leading end of the recording material P enters the fixing nip Pd, the moving speed of the recording material P is maintained in a slow state by the frictional resistance by the separation pad 26 of the sheet feeding portion 25. Then, at the instant when the trailing end of the recording material P passed through the sheet feeding portion 25 and the frictional resistance is eliminated, the moving speed of the recording material P is accelerated by the force instantaneously acting on the recording material P in a tensile direction. Thereafter, the moving speed of the recording material P coincides with the surface movement speed of the photosensitive drum 1.

Thus, in the case where the moving speed of the roller P changes, when a relative speed between the exposure interval with respect to the sub-scan direction and the surface movement speed of the photosensitive drum 1 is changed in advance so as to be returned to that in the normal state, it is possible to obtain an effect similar to that in Embodiment 1.

Further, in the above-described image forming apparatus 50, in order to eliminate the phenomenon that the moving speed of the roller P becomes slow by the frictional resistance by the separation pad of the sheet feeding portion, a constitution in which a roller for feeding the roller P is provided downstream of the sheet feeding portion with respect to the roller feeding direction may also be employed. This surface movement speed of the roller is set so as to be faster than the process speed.

In this case, when the trailing end of the roller P passed through the sheet feeding portion 25 and the frictional resistance is eliminated, the recording material P is accelerated in speed by the feeding force by the roller. At this time, the moving speed of the recording material P depends on the surface movement speed of the roller, and therefore, the recording material moving speed at the transfer nip Pb becomes faster than a normal moving speed (=process speed). Then, as soon as the trailing end of the recording material P passed through the roller, assistance by the roller feeding the roller P at a speed faster than the normal surface is eliminated, and therefore a force in a direction of reducing the recording material moving speed acts in a moment, and then the recording material moving speed becomes the normal moving speed.

Also in such a case, at proper timing prior to the timing when the external force exerted on the roller P changes, the relative speed between the exposure interval with respect to the sub-scan direction and the photosensitive drum surface movement speed is continuously changed. As a result, in accordance with the recording material moving speed changing depending on the change in external force exerted on the recording material P, it is possible to change the magnitude of the toner image on the surface of the photosensitive drum 1. Therefore, a similar effect to that in Embodiment 1 can be achieved.

In the above-described image forming apparatuses 50 and 60, the process speeds, the sizes, the materials and the shapes of the respective members and the constitutions of the fixing portion 6 and the sheet feeding portion 25 are examples, and the present invention is not limited thereto.

According to the present invention, it is possible to provide the image forming apparatus capable of suppressing the image expansion and contraction generating due to the change in external force exerted on the recording material and capable of outputting the image free from density non-uniformity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2016-087853 filed on Apr. 26, 2016, and 2017-051599 filed on Mar. 16, 2017, which are hereby incorporated by reference herein in their entirety.

What is claimed is:

1. An image forming apparatus for forming a toner image on a recording material, comprising:

a rotatable photosensitive member;

an exposure portion configured to expose said photosensitive member to light depending on image information to form a latent image on said photosensitive member;

a developing portion configured to use toner to develop the latent image into the toner image;

a feed roller configured to feed the recording material;

a transfer portion configured to transfer the toner image from said photosensitive member onto the recording material while the recording material passes through the transfer portion;

a fixing portion including a pair of rotatable members to form a fixing nip for conveying the recording material and configured to fix the toner image onto the recording material;

a single motor configured to drive said feed roller, said photosensitive member, and said pair of rotatable members; and a controller configured to control said single motor, wherein said pair of rotatable members includes a cylindrical film and a pressure roller, wherein said fixing portion includes a heater provided in an inner space of said film, wherein the fixing nip is formed between said heater and said pressure roller through said film, and wherein during a period when one sheet of the recording material passes through the transfer portion, said controller reduces a rotational speed of said motor at a predetermined first timing and a predetermined second timing after the predetermined first timing so as to reduce respective rotational speeds of said feed roller, said photosensitive member, and said pair of rotatable members at the predetermined first timing and the predetermined second timing.

2. The image forming apparatus according to claim 1, wherein the predetermined first timing is a timing after a leading end of the recording material passes through the transfer portion, and the predetermined second timing is a timing before a trailing end of the recording material passes by said feed roller.

3. The image forming apparatus according to claim 2, further comprising a pad in contact with said feed roller, wherein a press-contact portion for nipping the recording material is formed by said feed roller and said pad.

4. The image forming apparatus according to claim 1, wherein said transfer portion includes a transfer roller configured to nip the recording material with said photosensitive member.

* * * * *